United States Patent
Nishio et al.

(10) Patent No.: US 7,604,388 B2
(45) Date of Patent: Oct. 20, 2009

(54) LIGHT-GUIDING PLATE, LIGHTING DEVICE AND DISPLAY DEVICE

(75) Inventors: Chikara Nishio, Kawasaki (JP); Toshikazu Takahashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/071,404

(22) Filed: Feb. 20, 2008

(65) Prior Publication Data

US 2008/0212339 A1 Sep. 4, 2008

Related U.S. Application Data

(60) Continuation of application No. 11/103,453, filed on Apr. 12, 2005, now Pat. No. 7,356,239, which is a division of application No. 10/724,293, filed on Dec. 1, 2003, now Pat. No. 6,974,241.

(30) Foreign Application Priority Data

| Nov. 29, 2002 | (JP) | ............................ 2002-347302 |
| Oct. 1, 2003 | (JP) | ............................ 2003-342724 |
| Oct. 21, 2003 | (JP) | ............................ 2003-361180 |

(51) Int. Cl.
  *F21V 7/04* (2006.01)
(52) U.S. Cl. .................. 362/608; 385/146; 385/147; 385/901; 362/558; 362/615; 362/621
(58) Field of Classification Search ............. 385/146, 385/147, 901; 362/558, 608, 615, 612, 621
See application file for complete search history.

(56) References Cited

U.S. PATENT DOCUMENTS

| 5,961,197 | A | 10/1999 | Watai et al. | |
| 5,999,685 | A * | 12/1999 | Goto et al. | 385/146 |
| 6,371,623 | B1 | 4/2002 | Toyoda | 362/608 |
| 6,474,827 | B2 | 11/2002 | Shinohara et al. | 362/607 |
| 6,663,722 | B1 | 12/2003 | Higashino et al. | 385/146 |
| 6,879,355 | B1 | 4/2005 | Kim | 349/65 |
| 7,295,261 | B2 * | 11/2007 | Chen et al. | 349/62 |
| 2003/0090887 | A1 | 5/2003 | Igarashi et al. | 362/31 |
| 2006/0114372 | A1 * | 6/2006 | Saito et al. | 349/64 |

FOREIGN PATENT DOCUMENTS

| JP | 6-082635 | 3/1994 |
| JP | 9-160035 | 6/1997 |
| JP | 9-166713 | 6/1997 |

(Continued)

OTHER PUBLICATIONS

Partial translation of JP 9-166713.

(Continued)

*Primary Examiner*—Jennifer Doan
(74) *Attorney, Agent, or Firm*—Staas & Halsey LLP

(57) ABSTRACT

A light-guiding plate, an optical source device and an electronic device. The light-guiding plate including an incident surface, and an emission surface substantially perpendicular to the incident surface. The incident surface has a surface substantially perpendicular to the incident surface, and has projections or depressions extending substantially parallel to the emission surface. The incident surface has flat planes among the projections or depressions.

15 Claims, 27 Drawing Sheets

FOREIGN PATENT DOCUMENTS

| | | | |
|---|---|---|---|
| JP | 10-153777 | * | 6/1998 |
| JP | 10-214035 | | 8/1998 |
| JP | 10-253957 | | 9/1998 |
| JP | 11-224058 | | 8/1999 |
| JP | 2000-260216 | | 9/2000 |
| JP | 2000-276921 | | 10/2000 |
| JP | 2000-306410 | | 11/2000 |
| JP | 2002-216522 | | 8/2002 |

OTHER PUBLICATIONS

Partial translation of JP 10-253957.

Partial translation of JP 2000-260216.

Partial translation of JP 2002-216522.

Office Action (Notice for Reasons of Rejection) issued on Jan. 13, 2009 by the Japanese Patent Office.

* cited by examiner

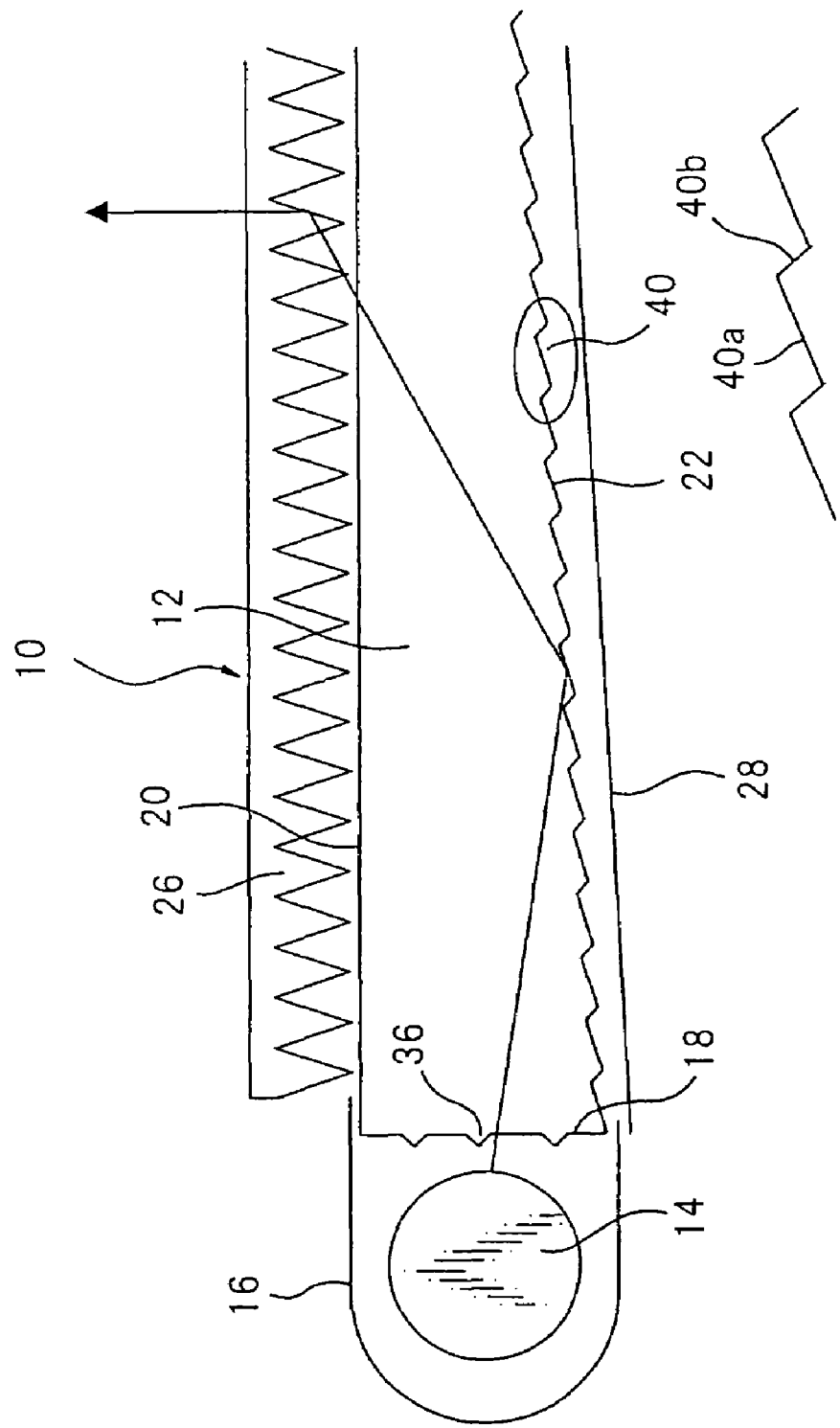

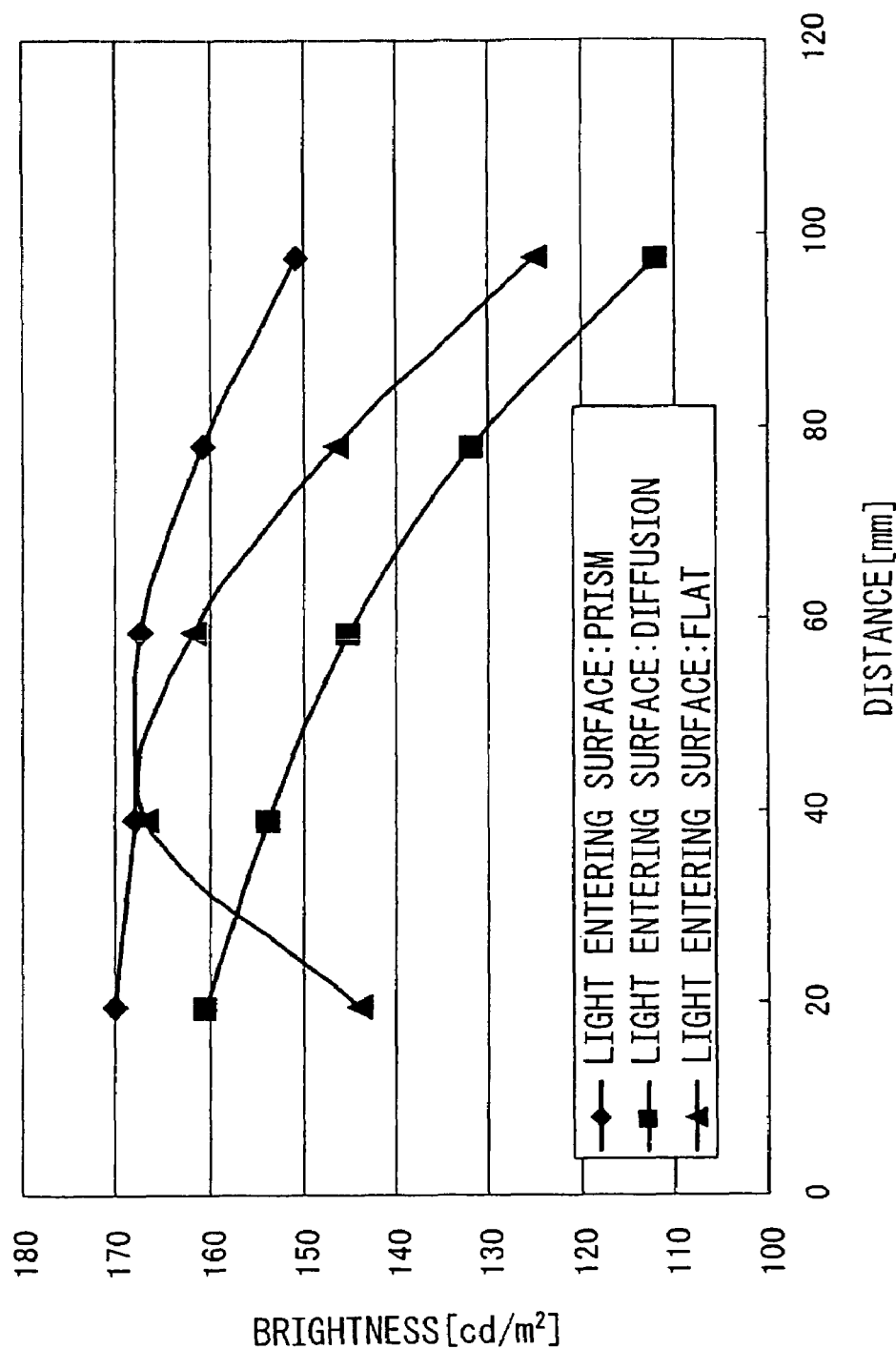

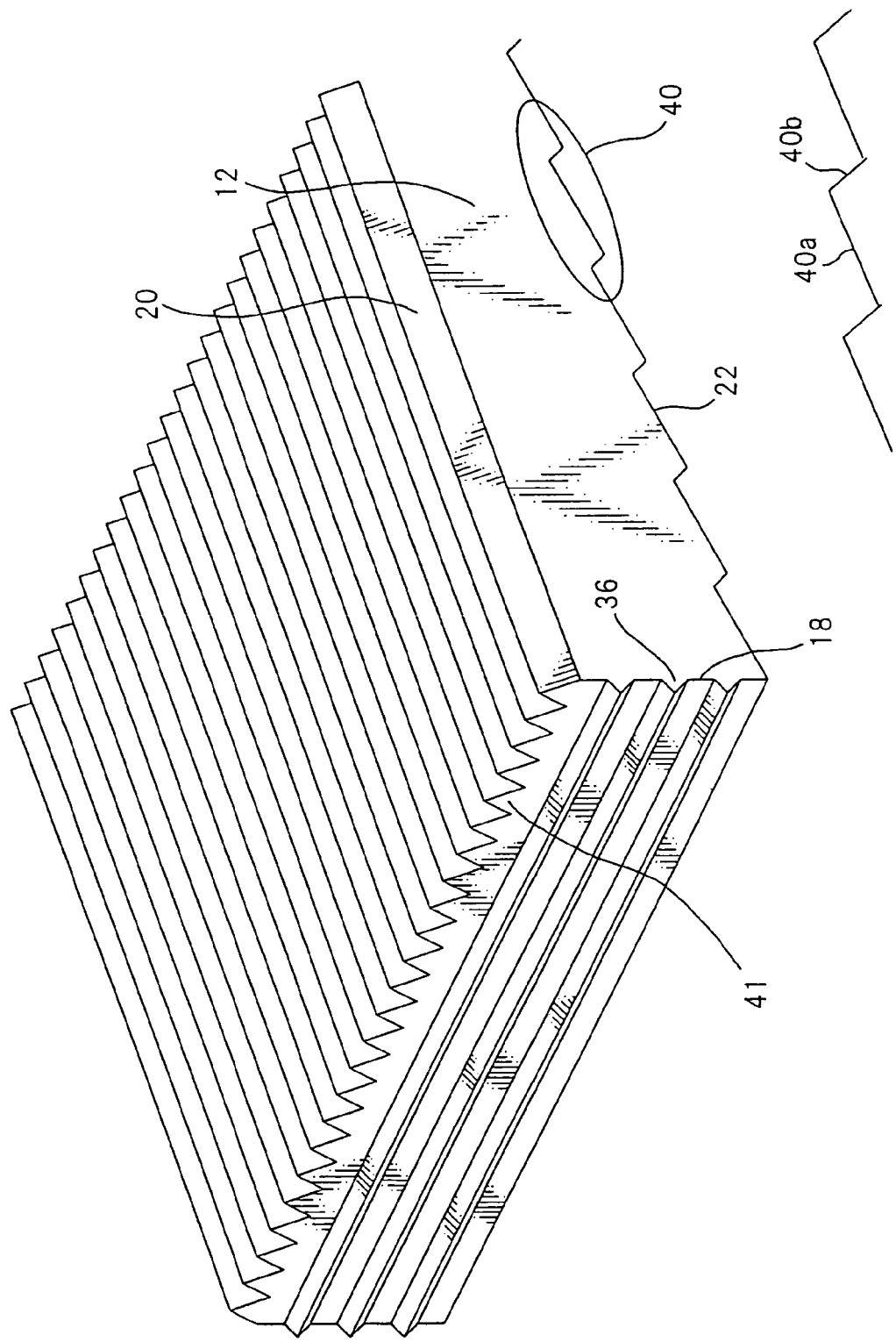

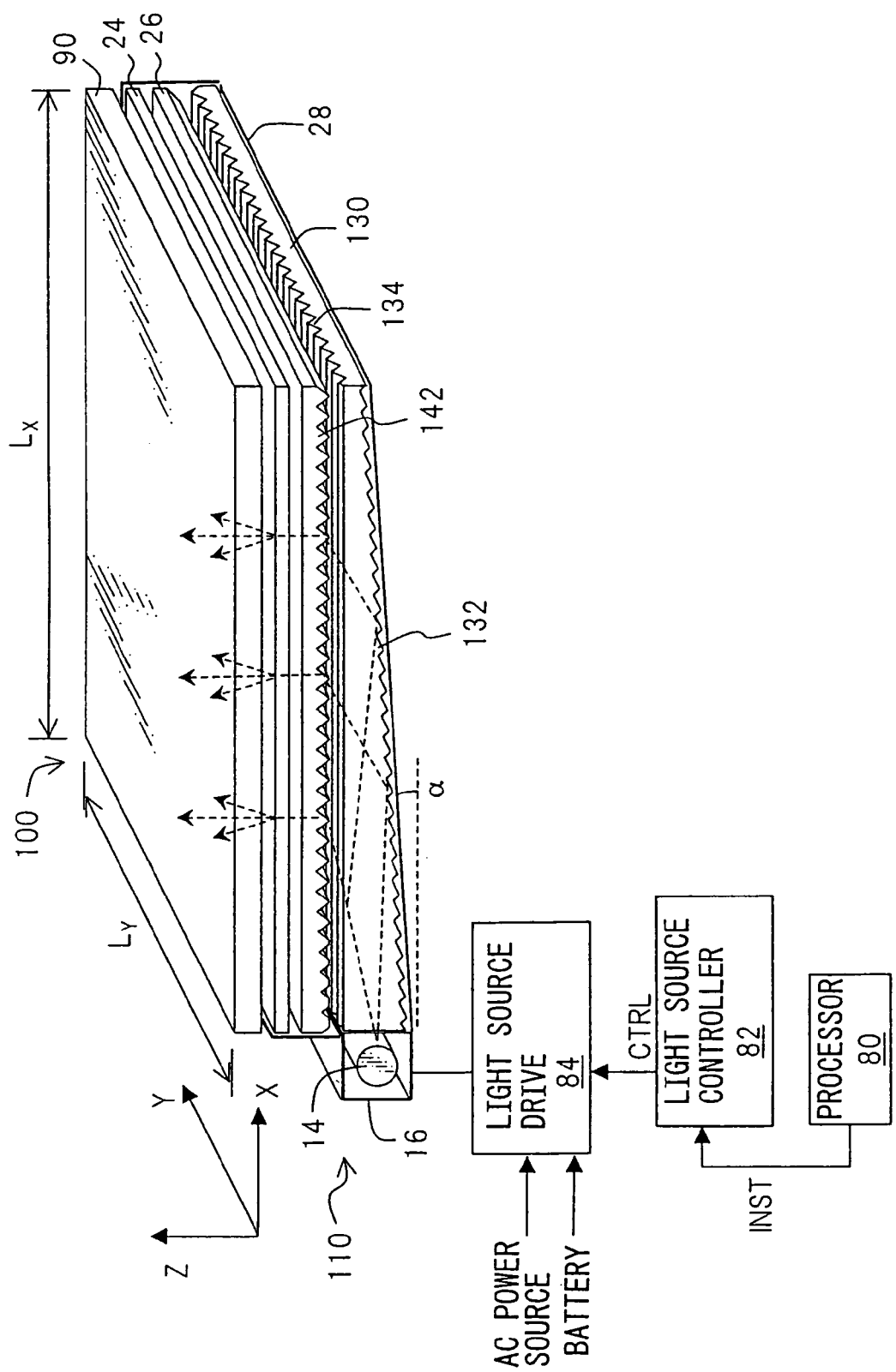

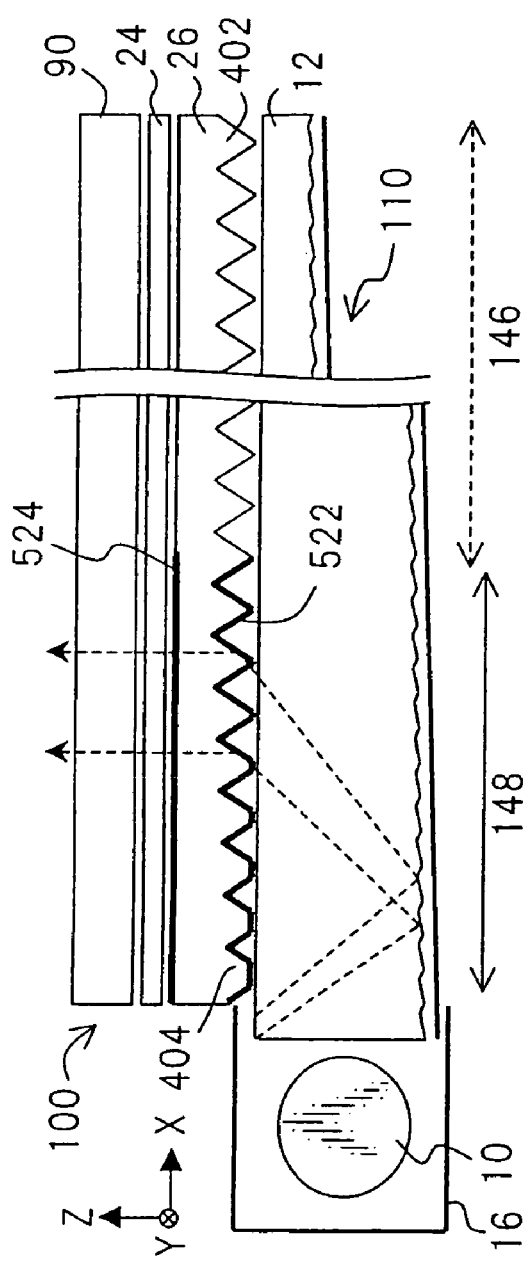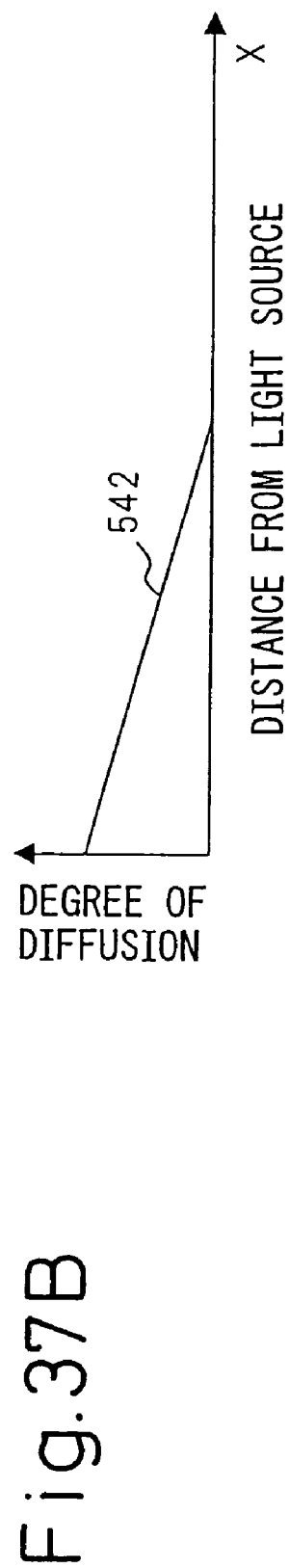
Fig.37A
Fig.37B

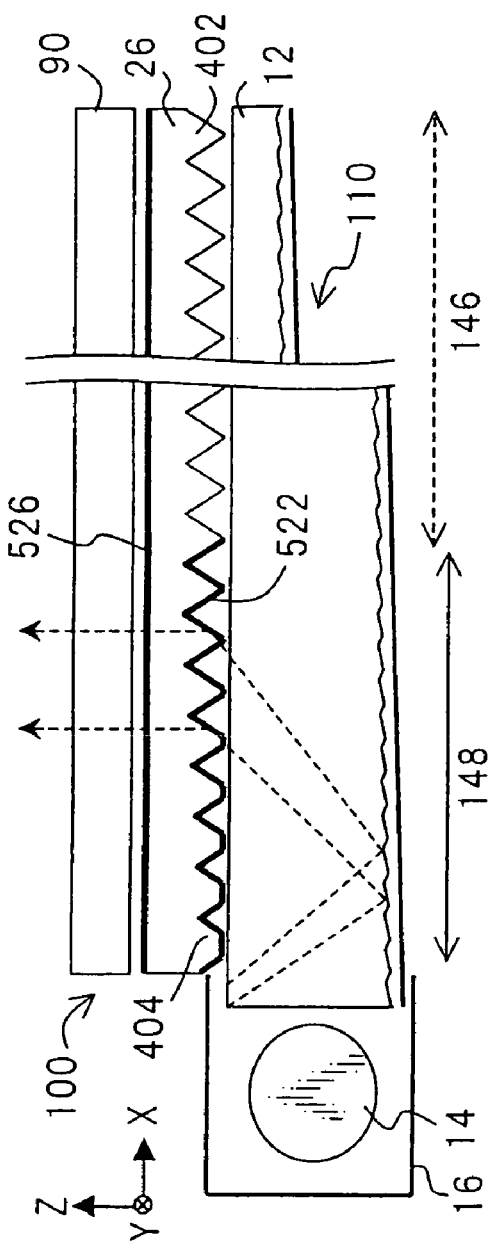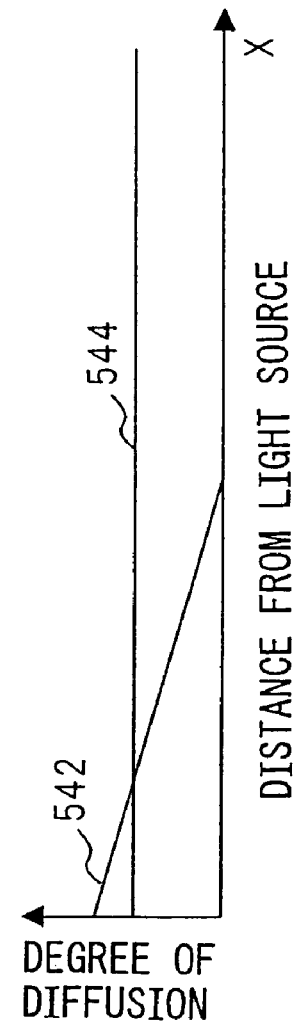
Fig.38A
Fig.38B

430

430

430

430

430

LIGHT-GUIDING PLATE, LIGHTING DEVICE AND DISPLAY DEVICE

CROSS-REFERENCE TO RELATED APPLICATIONS

This application is a Continuation Application of application Ser. No. 11/103,453, filed Apr. 12, 2005 now U.S. Pat. No. 7,356,239 which is now allowed, and which is a Divisional Application of and claims parent benefit under 35 U.S.C. §120 to application Ser. No. 10/724,293, filed Dec. 1, 2003, now patented as U.S. Pat. No. 6,974,241, and claims priority benefit of Japanese Application Nos. 2002-347302, 2003-342724 and 2003-361180, filed Nov. 29, 2002, Oct. 1, 2003 and Oct. 21, 2003, the disclosures of which are incorporated herein by reference.

BACKGROUND

1. Field of the Disclosure

The present invention relates to a reflector, a light, a light-guiding plate, and a display.

2. Description of the Related Art

In a display of a PC, a liquid crystal television, etc., a side light type light is used. In the case of a transmission type liquid crystal display device, a planar lighting device (backlight) is arranged on the back surface side of the liquid crystal panel. A side light type backlight includes a light-guiding plate, a light source arranged on one side of the light-guiding plate, and a reflector.

A reflector has for example a semicircular sectional shape or U-shape and is arranged to cover the light source, extend to the end parts of the light-guiding plate, and partially overlap the light-guiding plate. The light striking the incident surface of the light-guiding plate proceeds inside the light-guiding plate while being reflected. Therefore, to make the light be emitted from the emission surface of the light-guiding plate, the light-guiding plate is formed into a wedge sectional shape or an optical element comprised of a prism array, microlens array, etc. is arranged there.

Light striking the light-guiding plate by a large angle is emitted from a position of the emission surface of the light-guiding plate near the light source and sometimes becomes a cause of bright lines at the emission surface. Further, the weak intensity light sometimes becomes a cause of dark lines at the emission surface. In a side light type backlight, there is the problem of the occurrence of uneven brightness including bright lines and dark lines.

Further, in a conventional side light type backlight, the entering surface is not processed at all, so there is the problem of the luminance near the light source ending up falling. FIG. 30 shows the results of verification of the luminance distribution in a perpendicular direction from the light source due to differences in treatment of entering surfaces. The reflection surface of the light-guiding plate uses a prism light-guiding plate and emits light from the emission surface inclined from the normal by 60 to 70 degrees. The emitted light is bent in the normal direction by the downward-facing prism lens sheet. From the results, it can be confirmed that the conventional luminance distribution in the flat state of the entering surface with no treatment given exhibits a drop in the luminance near about 20 mm near the light source.

To solve this problem, it has been proposed to roughen the incident surface of the light-guiding plate to eliminate the uneven luminance (see for example Patent Document 1 below). The light strikes the roughened incident surface and is scattered. The amount of light emitted from the part of the emission surface of the light-guiding plate near the light source increases, but the amount of light emitted from the part of the emission surface of the light-guiding plate far from the light source ends up becoming smaller. Further, part of the light scattered at the incident surface of the light-guiding plate is not effectively propagated inside the light-guiding plate and the efficiency of utilization of the light drops. The roughening is performed uniformly over the entire incident surface of the light-guiding plate.

FIG. 30 shows the luminance distributions in the case of attaching diffusion treated tapes instead of diffusion treatment of the entering surface. By diffusion treatment of the entering surface, the luminance near the light source rises, but the amount of light at the far part becomes smaller, so there was the problem that the luminance ended up gradually falling.

Further, there is a proposal to arrange a prism sheet between the light source and the light-guiding plate (for example, see Patent Documents 2 and 3 below). The diffusion light emitted from the light source is condensed by the prism sheet to become highly oriented light which strikes the incident surface of the light-guiding plate. However, if highly oriented light strikes the incident surface of the light-guiding plate, the amount of emission of light from the end part of the light-guiding plate near the light source becomes smaller and the uneven luminance at the end part of the light-guiding plate near the light source is not eliminated.

Further, there is a proposal to form grooves extending perpendicular to the emission surface of the light-guiding plate at the incident surface of the light-guiding plate (for example, see Patent Document-4 below). This prior art has as its object the provision of a display becoming darker at the end part positioned at the electrode of the lamp forming the light source.

Further, there is a proposal to form an inclined surface reflecting light at an end part of a reflection sheet arranged at a reflection surface side of a light-guiding plate at the side opposite to the emission surface (for example, see Patent Document 5 below). In this prior art, the phenomenon of wide angle light emitted from the light source being reflected at the end part of the reflection sheet and striking the light-guiding plate is prevented by making such light be reflected at the inclined surface of the reflection sheet and returning it to the light source side. Due to this, the appearance of bright lines at the emission surface of the light-guiding plate is prevented. However, this prior art can only be used in a basic configuration where the end part of the reflection sheet is arranged between the light-guiding plate and one end part of the reflector, and the other end part of the reflector is in close contact with the light-guiding plate. When the end part of the reflection sheet is arranged at the outside from one end part of the reflector or when there is a gap between the other end part of the reflector and the light-guiding plate, this prior art cannot be applied.

Patent Document 1: Japanese Unexamined Patent Publication (A) No. 9-160035

Patent Document 2: Japanese Unexamined Patent Publication (A) No. 9-166713

Patent Document 3: Japanese Unexamined Patent Publication (A) No. 2000-260216

Patent Document 4: Japanese Unexamined Patent Publication (A) No. 10-253957

Patent Document 5: Japanese Unexamined Patent Publication (A) No. 2002-216522

SUMMARY OF THE INVENTION

An object of the present invention is to provide a lighting device, a light-guiding plate, and a display device excellent in uniformity of luminance free from bright lines and other unevenness of luminance.

The reflector according to the present invention is characterized by having a curved part and a pair of end parts extending at the two sides of the curved part and by the inside surface of each end part having a plurality of substantially parallel projections or depressions.

According to this configuration, the light emitted from the light source is reflected at the projections or depressions of the inside surfaces of the end parts of the reflector and returns toward the light source. Due to this, the light emitted from the light source is prevented from striking the light-guiding plate by a large angle, being emitted from the emission surface, and generating bright lines.

A lighting device according to the present invention is characterized in that it is comprised of said reflector, light-guiding plate, and light source, said light source is arranged at a side of said light-guiding plate, said reflector is arranged around said light source, and said end parts of said reflector partially overlap said light-guiding plate.

Further, it is possible to form a display device along with this lighting device.

In this case as well, bright lines are prevented from occurring.

Further, a light-guiding plate according to the present invention comprises an incident surface and an emission surface substantially perpendicular to said incident surface, said incident surface having a plurality of projections or depressions extending substantially parallel to said emission surface.

According to this configuration, it is possible for the projections or depressions provided at the inside surface of the light-guiding plate to correct the angular distribution and intensity distribution of the light source and to obtain a light with an excellent uniformity of luminance free of uneven luminance. In this case, since the projections or depressions extend substantially parallel to the emission surface of the light-guiding plate, it is possible to eliminate uneven luminance including bright lines and dark lines.

Further, the present invention provides a display device comprising the above reflector, the above light-guiding plate, a light source, and a display element, said light source being arranged at a side of said light-guiding plate, a curved part of said reflector being arranged around said light source, and said end parts of said reflector partially overlapping said light-guiding plate.

Further, the light-guiding plate of the present invention is characterized in that the shape of the plurality of projections or depressions of the incident surface changes according to the position and becomes larger the more to the top and bottom ends far from the light source and smaller the more to the center close to the light source. Near the entering surface, light is provided from the projections or depressions of the top and bottom ends. Far it, more light is provided far from the center part with few projections or depressions. Due to this, it becomes possible to provide light both near to and far from the entering surface.

Further, the light-guiding plate of the present invention is characterized in that the pitch of the plurality of projections or depressions of the incident surface changes according to the position with the pitch becoming smaller the further to the top and bottom ends far from the light source and with the pitch becoming larger the more to the center close to the light source. Due to this, it becomes possible to provide light both near to and far from the entering surface.

Further, the light-guiding plate of the present invention is characterized by having said entering surface and a reflection surface having a prism array continuously forming prisms parallel to the longitudinal direction of said incident surface. It is possible to realize a substantially uniform luminance distribution from near the light source to opposite the light source by the combination of this entering surface and reflection surface.

Further, the light-guiding plate of the present invention is characterized by having said incident surface and an emission surface having a prism array continuously forming prisms perpendicular to the longitudinal direction of said entering surface. By this emission surface, it is possible to condense the light in a direction parallel to the longitudinal direction of the entering surface.

Further, the present invention is characterized in that in said light-guiding plate, the reflection sheet is comprised of a sheet on which aluminum, a silver alloy, or another metal is vapor deposited or to which a metal film is bonded (regular reflection rate of at least 80%). Compared with a conventional thermoplastic resin sheet in or on which titanium oxide, barium titanate, etc. is mixed or coated, there is less diffusion of light reflected at the reflection sheet and the overall luminance can be improved.

Further, according to the characteristics of the present invention, the planar light device is provided with a side light source, a light-guiding plate, and a prism sheet, the side light source is arranged at the side surface of one of the two side surfaces facing each other at that light-guiding plate, the light-guiding plate and said prism sheet are arranged superposed on each other, and the prism sheet includes a plurality of prism parts at the light-guiding plate side and is configured so that the ratio of the area of inclined surfaces per unit area is reduced at a region of a range up to a predetermined distance from the side light source compared with the center region.

Further, the present invention provides the above prism sheet. Further, the present invention provides a liquid crystal display device including the above planar lighting device. The present invention further provides an electronic device including the above liquid crystal display device.

Due to the above characteristics, the effects are exhibited that it is possible to reduce the light near the light source in a planar lighting device and that a planar lighting device having an overall uniform luminance distribution including near the light source can be realized.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 29 is a view of a modification of the lighting device of the present invention;

FIG. 30 is a view of a brightness distribution due to differences in processing of an entering surface;

FIG. 31 is a view of a modification of the light-guiding plate of the present invention;

FIG. 32 is a perspective view of a liquid crystal display including a planar light source in a portable electronic device according to an embodiment of the present invention and shows a microprocessor, a light source controller, and a light source drive;

FIG. 37A is a side view of a planar light source device having a prism sheet treated for diffusion to make the luminance more uniform at a region near the light source;

FIG. 37B shows the degree of diffusion treatment with respect to the distance from the light source in the X-direction at the prism sheet of FIG. 37A;

FIG. 38A is a side view of a planar light source device having a prism sheet treated for diffusion to make the luminance more uniform at a region near the light source and treated for diffusion to enlarge the viewing angle;

FIG. 38B shows the distribution of the degree of diffusion treatment with respect to the distance from the light source in the X-direction at the prism sheet of FIG. 38A;

DESCRIPTION OF THE PREFERRED EMBODIMENTS

Figure 1:
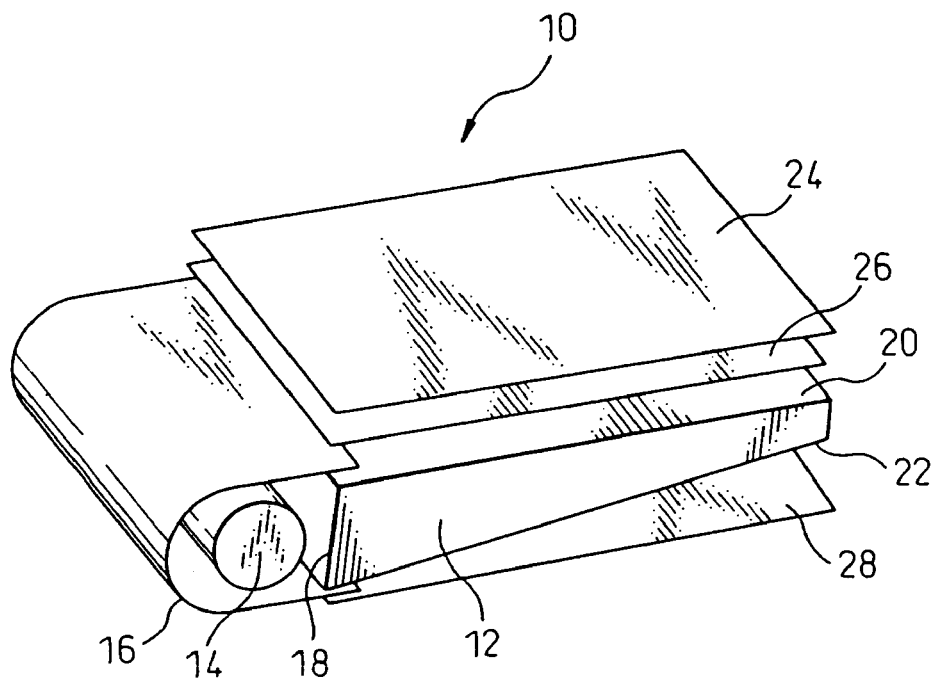
FIG. 1 is a schematic perspective view of a lighting device of an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Figure 2:
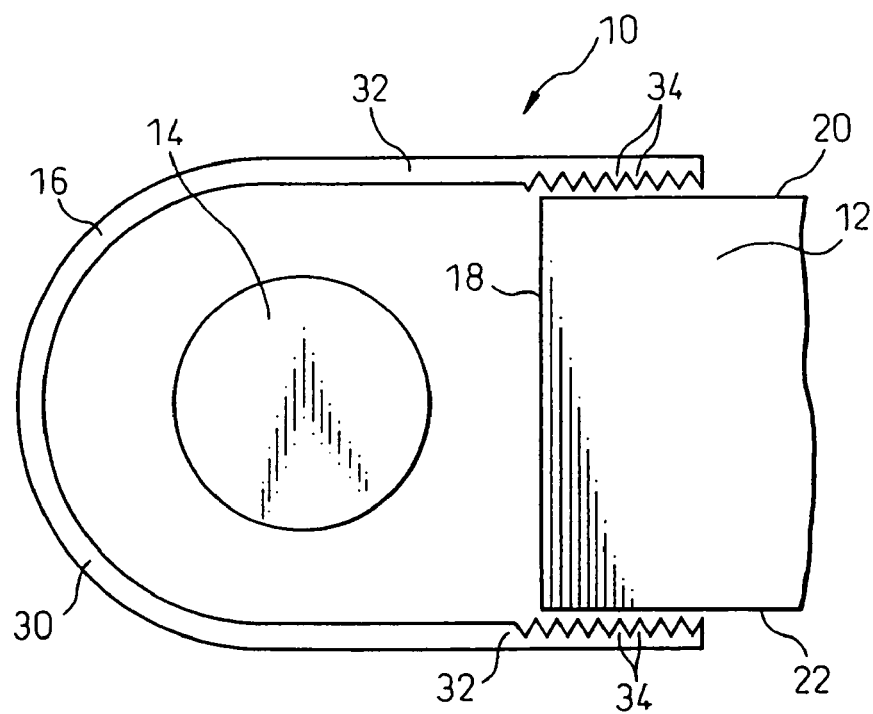
FIG. 2 is an enlarged side view of part of the lighting device of FIG. 1.
Figure 3:
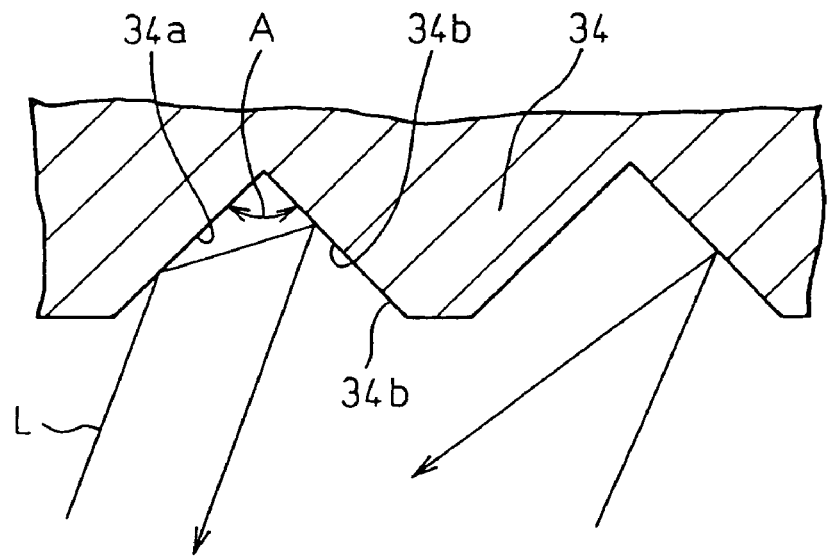
FIG. 3 is a sectional view of projections or depressions at an inside surface of an end part of a reflector of FIG. 2.

FIG. 1 is a schematic perspective view of a lighting device 10 of an embodiment of the present invention. FIG. 2 is an enlarged side view of part of the lighting device of FIG. 1. FIG. 3 is a sectional view of projections or depressions 34 at an inside surface of an end part 32 of a reflector 16 of FIG. 2.

The lighting device 10 is comprised of a light-guiding plate 12, a rod-shaped light source 14 comprised of a cold cathode fluorescent lamp arranged on one side of the light-guiding plate 12, and a reflector 16 covering the light source 14.

The light-guiding plate 12 has an incident surface (end surface) 18 extending long parallel to the light source 14, an emission surface (top surface) 20 substantially perpendicular to the incident surface 18, and a reflection surface (bottom surface) 22 at the side opposite to the emission surface 20. The light-guiding plate 12 is formed in a wedge shape. The reflection surface 22 is inclined with respect to the emission surface 20. A diffusion plate 24 and a prism sheet 26 or other light adjusting sheet are arranged on the emission surface 20 side of the light-guiding plate 12, while a reflection sheet 28 is arranged on the reflection surface 22 side of the light-guiding plate 12.

The light-guiding plate 12 is made from transparent acrylic resin (PMMA) having a refractive index of 1.49. However, the light-guiding plate 12 may be made by a resin other than an acrylic resin. For example, an optically transparent material having a refractive index of 1.4 to 1.7, for example, polycarbonate (PC), may be employed. The reflection surface 22 of the light-guiding plate 112 is provided with dots 21 of a diffusion material (FIG. 4) by printing etc. The reflector 16 is comprised of a nonconductive sheet on which aluminum, a silver alloy, or other metal is vapor deposited. The reflection sheet 28 is comprised of a nonconductive sheet on which aluminum or another metal is vapor deposited, on which a metal film is bonded, or with or on which titanium oxide, barium titanate, etc. is mixed or coated.

The reflector 16 has a curved part 30 covering the light source 14 and a pair of end parts 32 extending in parallel at the two sides of the curved part 30. The end parts 32 extend over the incident surface 18 of the light-guiding plate 12 to partially overlap the light-guiding plate 12. There is a gap between the end parts 32 and the light-guiding plate 12. If bringing the end parts 32 and the light-guiding plate 12 into close contact, a structure for holding down the end parts 32 from the emission surface 20 side becomes necessary. Further, if bonding the end parts 32 and the light-guiding plate 12, use of an adhesive becomes necessary. If using an adhesive, the optical properties are liable to change.

The reflection sheet 28 is arranged at the outside from an end part 32 of the reflector 16 (side far from light-guiding plate 12). If the reflection sheet 28 is arranged outside from the end part 32 of the reflector 16, when assembling the light 10, it is sufficient to place a unit comprised of the light-guiding plate 12, light source 14, and reflector 16 on the reflection sheet 28, so assembly becomes easy.

In the reflector 16, the inside surface of each end part 32 overlapping the light-guiding plate 12 has a plurality of projections or depressions (rib structures or groove structures) 34. In FIGS. 2 and 3, the projections or depressions 34 are formed as triangular grooves (V-grooves) provided at the inside surface of the end part 30. Each triangular groove is formed by two inclined surfaces 34a and 34b extending long in parallel to the light source 14. As shown in FIG. 3, light L reaching the projections or depressions 34 by a large angle is reflected at the inclined surface 34b and returned to the incident surface 18 of the light-guiding plate 12. The angle A between the two inclined surfaces 34a and 34b is preferably 90 degrees. Of course, the depth or interval of the triangular grooves (V-grooves) can be changed considering the thickness of the reflector 16, the working conditions (for example, pressing), etc. A continuous sawtooth shape is also possible. In the present invention, the projections or depressions 34 are formed integrally with the reflector 16, so there is no increase in the number of parts and assembly of the lighting device 10 is also easy.

Figure 4:
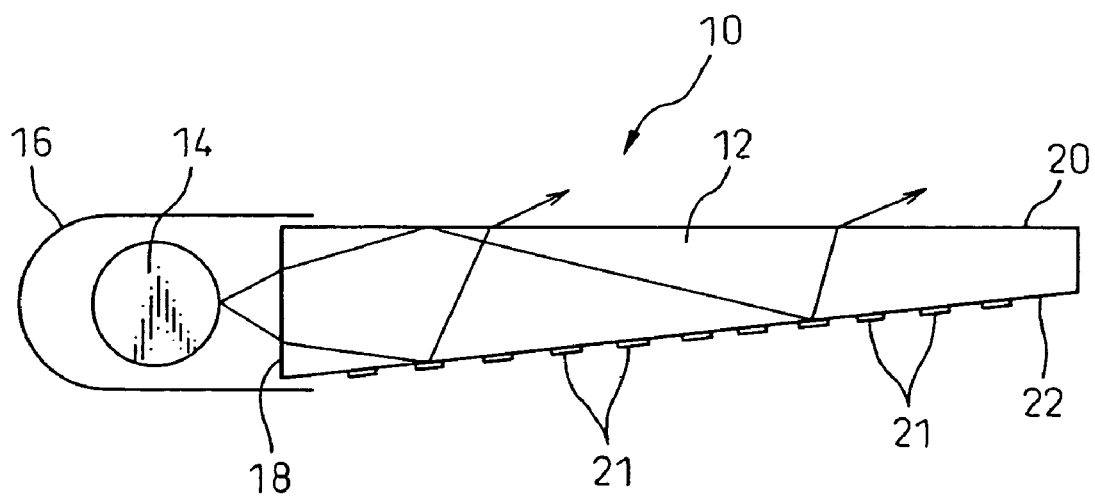
FIG. 4 is a view explaining the basic action of the lighting device.

FIG. 4 is a view explaining the basic action of the lighting device 10. The light striking the incident surface 18 of the light-guiding plate 12 is not directly emitted from the emission surface 20 of the light-guiding plate 12, but is propagated inside the light-guiding plate 12 while being reflected at the emission surface 20 and the reflection surface 22. The reflection surface 22 is inclined with respect to the emission surface 20, so the angle of the light reflected at the reflection surface with respect to the normal of the emission surface 20 becomes smaller and the light is emitted from the emission surface 20 a little at a time as it proceeds toward the end surface at the opposite side to the incident surface 18. In this way, the light is emitted from the emission surface 20 as a whole.

Figure 5:
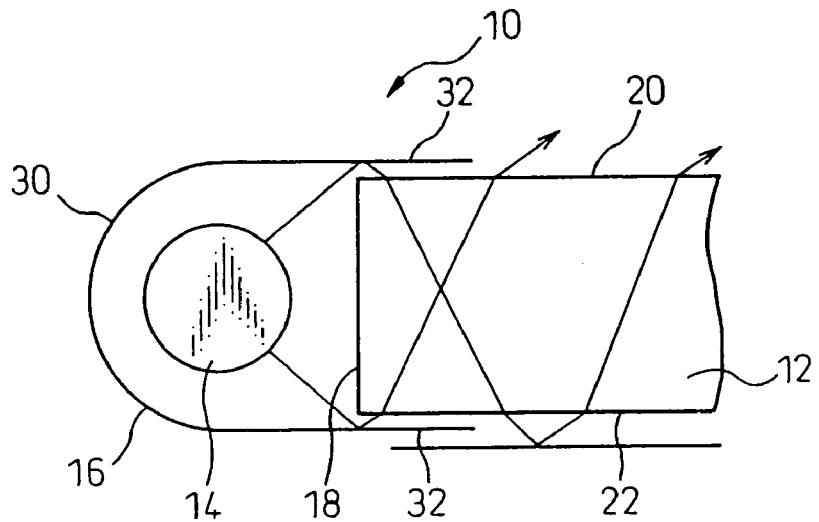
FIG. 5 is a view of an example of light being reflected at the end parts of the reflector and striking the emission surface and the reflection surface of a light-guiding plate in the case of no projections or depressions.

FIG. 5 is a view of an example of light being reflected at the end parts 32 of the reflector 16 and striking the emission surface 20 and reflection surface 22 of the light-guiding plate 12 in the case of no projections or depressions 34 and a gap between the light-guiding plate 12 and reflector 16. If there are no projections or depressions 34, if light strikes the emission surface 20 and reflection surface 22 of the light-guiding plate 12 by a relatively large angle, the light is emitted from the emission surface 20 at positions close to the overlapping parts of the reflector 16 and the light-guiding plate 12 and bright lines are caused at the emission surface 20. Therefore, as shown in FIGS. 2 and 3, the inside surfaces of the end parts 32 of the reflector 32 are provided with projections or depressions 34 to cause such light to be reflected at the inclined surfaces 34b of the projections or depressions 34 and return in the direction of the light source 14 to eliminate the bright lines.

Figure 6:
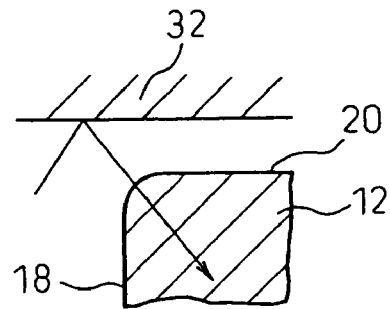
FIG. 6 is a view showing an example of light reflected at an end part of a reflector striking the light-guiding plate from the edge of an incident surface of the light-guiding plate in FIG. 7 is a view of an example of light passing through the edge of the incident surface of the light-guiding plate and being reflected at the end part of the reflector striking the light-guiding plate in the case of no projections or depressions.

FIG. 6 is a view showing an example of light reflected at an end part 32 of the reflector 16 passing through the edge of the incident surface 18 of the light-guiding plate 12 and striking the light-guiding plate 12 in the case of no projections or depressions 34. The edges of the incident surface 18 of the light-guiding plate 12 sometime are rounded when seen microscopically. In this case as well, the light strikes with a large angle and bright lines occur on the emission surface 20.

Figure 7:
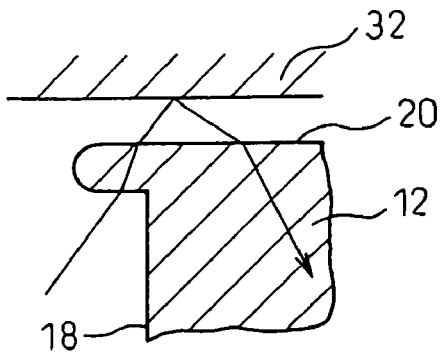

FIG. 7 is a view of an example of light passing through the edge of the incident surface 18 of the light-guiding plate 12 and being reflected at the end part 32 of the reflector 16 striking the emission surface 20 and the reflection surface 22 of the light-guiding plate in the case of no projections or depressions 34. If viewing microscopically the edges of the incident surface 18 of the light-guiding plate 12, sometimes burrs are included. In this case as well, the light strikes by a large angle and bright lines occur at the emission surface 20.

As shown in FIGS. 6 and 7, bright lines occur when the edges of the incident surface 18 of the light-guiding plate 12 are imperfect. Therefore, projections or depressions 34 are provided at the inside surfaces of the end parts 32 of the reflector 16 so that undesirable light is reflected at the inclined surfaces 34b of the projections or depressions 34 and returned in the direction of the light source 14 so that bright lines do not occur.

Therefore, light passing through the gaps of the overlapping parts of the end parts 32 of the reflector 16 and the light-guiding plate 12 or the imperfect edges of the incident surface 18 of the light-guiding plate 12 has a harder time heading in the direction of the end face of the light-guiding plate 12 at the opposite side of the incident surface 18 due to the triangular grooves (V-grooves) (amount of light heading to end face of opposite side is reduced) or returns to the incident surface 18 side of the light-guiding plate 12, whereby bright lines occurring at a position of the emission surface 20 of the light-guiding plate 12 close to the light source 14 are reduced.

Figure 8:
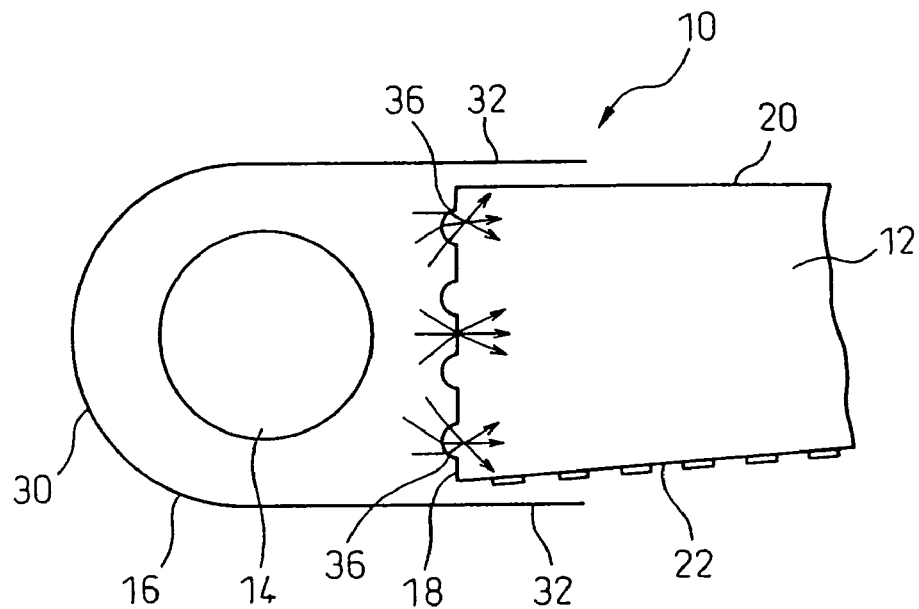
FIG. 8 is a schematic sectional view of an example of a lighting device of the present invention.
Figure 9:
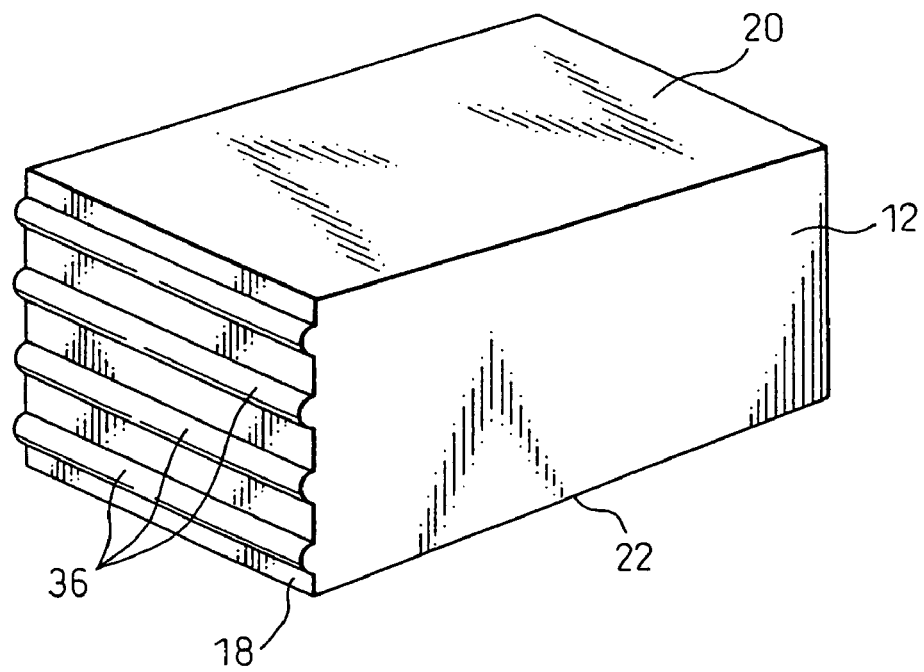
FIG. 9 is a perspective view of a light-guiding plate of FIG. 8.

FIG. 8 is a schematic sectional view of an example of a lighting device 10 of the present invention. FIG. 9 is a perspective view of a light-guiding plate 12 of FIG. 8. The lighting device 10 is comprised of a light-guiding plate 12, a rod-shaped light source 14 comprised of a cold cathode fluorescent lamp arranged on one side of the light-guiding plate 12, and a reflector 16 covering the light source 14.

The light-guiding plate 12 has an incident surface 18 extending long parallel to the light source 14, an emission surface 20 substantially perpendicular to the incident surface 18, and a surface (reflection surface) 22 at the opposite side to the emission surface 20. The light-guiding plate 12 is formed in a wedge shape with the reflection surface 22 inclined with respect to the emission surface 20. It is also possible to provide a diffusion plate 24 or prism sheet 26 or other light adjusting sheet and a reflection sheet 28 shown in FIG. 1. The reflector 16 has a curved part 30 covering the light source 14 and a pair of end parts 32 extending parallel at the two-sides of the curved part 30. The end parts 32 extend over the incident surface 18 of the light-guiding plate 12 to partially overlap the light-guiding plate 12.

In the light-guiding plate 12, the incident surface 18 has a plurality of projections or depressions (rib structures or groove structures) 36 extending substantially in parallel with the emission surface 20. The projections or depressions 36 prevent striped patterns of brightness (uneven brightness) at the emission surface 20.

In the conventional side light type backlight, there was the problem that near the incident surface, parts of high luminance levels (that is, bright lines) and parts of low luminance levels (that is, dark lines) occurred in parallel with the incident surface 18 and uneven luminance occurred in the emission light. The occurrence of such bright lines and dark lines resulted in a reduction of the commercial value as a planar light source used for a liquid crystal display device. Prevention of this had become a big issue. This uneven luminance occurs due to the difference in the angular distribution of the light striking from the incident surface 18 depending on the position in the vertical direction of the incident surface 18.

Figure 10:
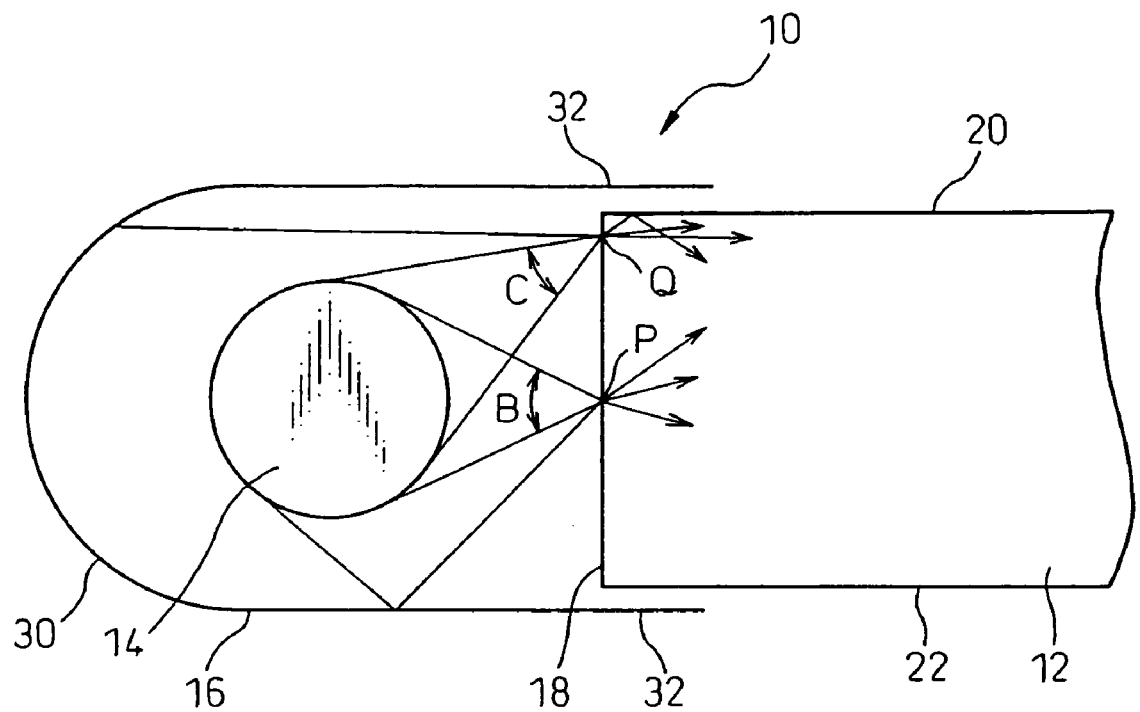
FIG. 10 is a view of an example of light striking an incident surface of a light-guiding plate in the case of no projections or depressions.

FIG. 10 is a view of an example of light striking an incident surface 18 of a light-guiding plate 12 in the case of no projections or depressions 36. In FIG. 10, part of the light emitted from the light source 14 directly strikes the light-guiding plate 12, while another part of the light emitted from the light source 14 is reflected at the reflector 16, then (indirectly) strikes the light-guiding plate 12. The directly striking light reaches the incident surface 18 of the light-guiding plate 12 with substantially zero loss, so the intensity of the light is great, but the indirectly striking light suffers some loss when reflected at the reflector 16, so the intensity of the light is small.

The amount and angular distribution of directly striking light and indirectly striking light differ depending on the position of the incident surface 18 of the light-guiding plate 12. For example, for the directly striking light, the angular distribution B of the light striking the center P of the incident surface 18 near the light source 14 becomes larger than the angular distribution C of the light striking the top and bottom ends Q of the incident surface 18. The light reflected at the reflector 16 and striking the incident surface 18 strikes by a larger angle and relatively weaker intensity compared with the directly striking light. As a result, for the light striking the center P of the incident surface 18, light having a large intensity strikes by a large angular range, while for light striking the top and bottom ends Q of the incident surface 18, light having a large intensity strikes with a small angular range. That is, for light striking the top and bottom ends Q of the incident surface 18, light with a large magnitude strikes with a small intensity.

Figure 11:
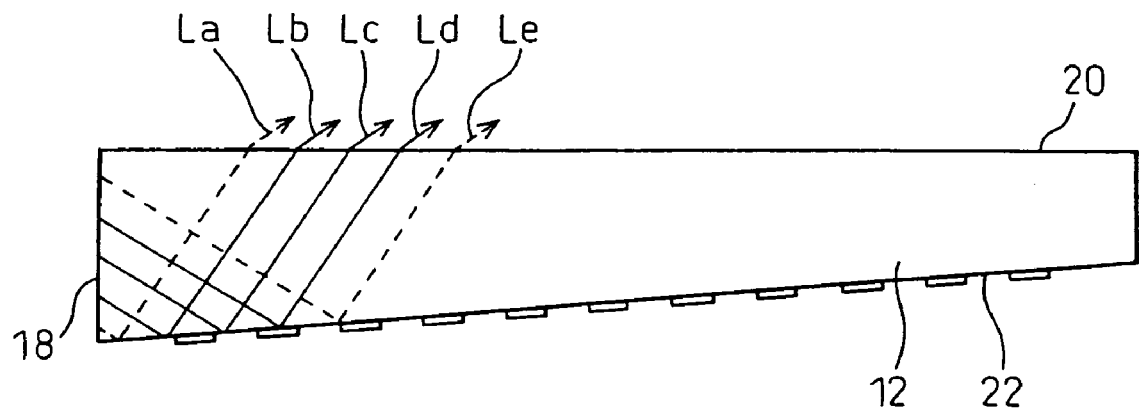
FIG. 11 is a view of an example of a stripe pattern of brightness at an emission surface of a light-guiding plate in the case of no projections or depressions of FIGS. 8 and 9.

FIG. 11 is a view of an example of a stripe pattern of brightness at an emission surface of a light-guiding plate in the case of no projections or depressions of FIGS. 8 and 9. The distribution of the light emitted from the emission surface 20 of the light-guiding plate 20 becomes for example the weak light La, strong light Lb, strong light Lc, strong light Ld, and weak light Le. The light striking the top and bottom ends Q of the incident surface 18 has a small intensity at a certain incidence angle and is emitted from the emission surface 20 as the weak light La and Le. The light striking the center P of the incident surface 18 has a large intensity at the same angle and is emitted from the emission surface 20 as the strong light Lb, Lc, and Ld. Therefore, a striped pattern of brightness occurs.

In FIGS. 8 and 9, the light striking the incident surface 18 of the light-guiding plate 12 is refracted at the projections or depressions 36 of the incident surface 18, while the strong light directly striking the light-guiding plate 12 from the light source 14 spreads toward the emission surface 20 and reflection surface 22 side. Therefore, for the light striking the top and bottom ends Q of the incident surface 18, light having a large intensity proceeds in the light-guiding plate 12 with a large angular range. Therefore, for example, the weak light La and Le of FIG. 11 become strong light and the striped pattern of brightness disappears. At the center P of the incident surface 18, the incident surface 18 is left flat. By providing the projections or depressions 36 at the incident surface 18, the light does not scatter to the four directions and loss can be suppressed compared with the method of roughening the incident surface. Further, the structures can be managed by the shapes and dimensions of the projections or depressions 36 extending straight rather than by the surface roughness (Ra) and other statistical techniques.

Figure 12:
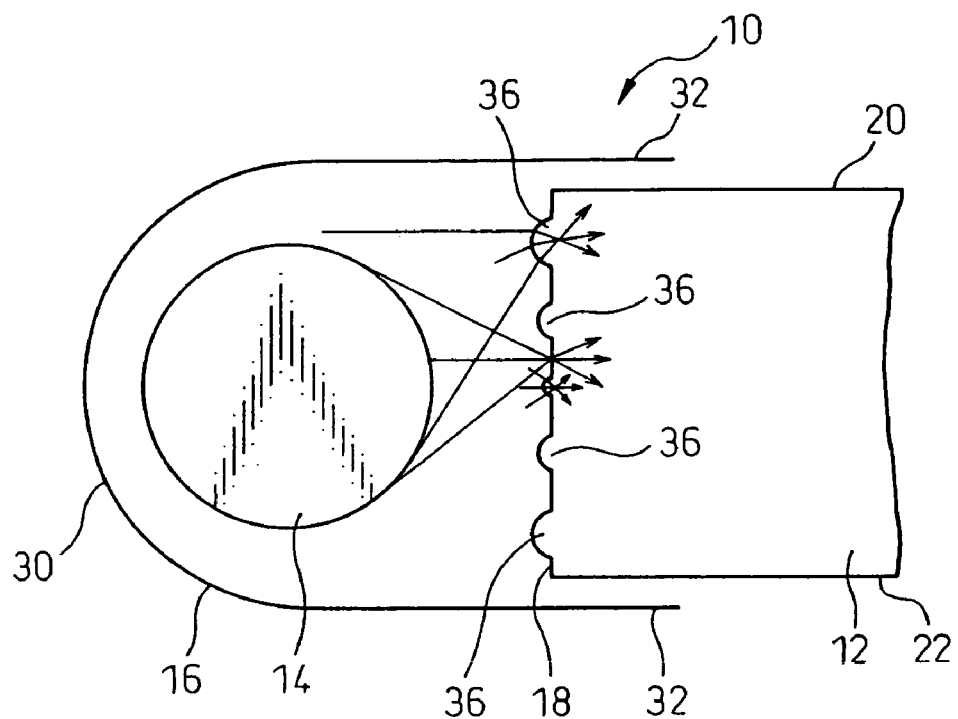
FIG. 12 is a view of a modification of the light-guiding plate of FIG. 8.

FIG. 12 is a view of a modification of the light-guiding plate 12 of FIG. 8. In this example, the shape of the plurality of projections or depressions 36 extending along the long side of the incident surface 18 of the light-guiding plate 12 is made to change in accordance with the position of the incident surface 18. The projections or depressions 36 become larger the more to the top and bottom ends far from the light source 14 and become smaller the more to the center close to the light source 14. The more to the center close to the light source 14 where the angle of the directly striking light is large, the larger (broader) is made the area of the flat surface of the incident surface 18 perpendicular to the emission surface 20, while conversely the more to the top and bottom ends far from the light source 14 where the angle of the directly striking light is small, the smaller (narrower) is made the area of the flat surface of the incident surface 18 perpendicular to the emission surface 20 so as to keep the angular distribution of the light striking the light-guiding plate 12 from changing depending on the position of the incident surface.

Figure 13:
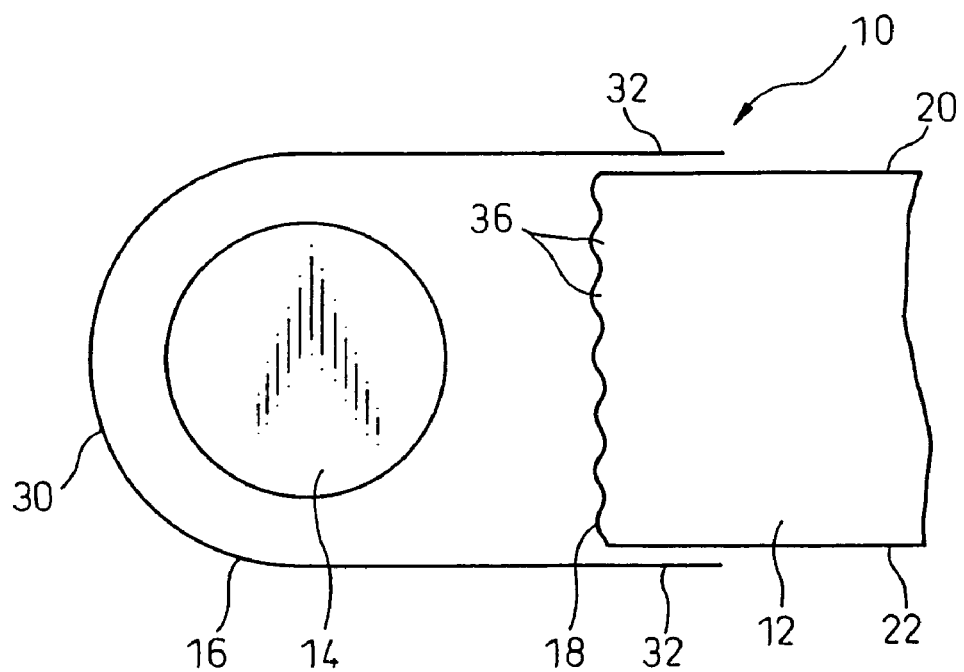
FIG. 13 is a view of a modification of the light-guiding plate of FIG. 8.

FIG. 13 is a view of a modification of the light-guiding plate 12 of FIG. 8. In this example, a plurality of projections or depressions 36 are formed along the long side direction of the incident surface 18. When viewed by the short side direction of the incident surface 18, they are formed as wavy curves. The light striking the light-guiding plate 12 is refracted by the projections or depressions 36 of the incident surface 18 toward the emission surface 20 and reflection surface 22, while the strong light directly striking the light-guiding plate 12 from the light source 14 heads toward the emission surface 20 and reflection surface 22 close to the light source 14.

Figures 14A, 14B:
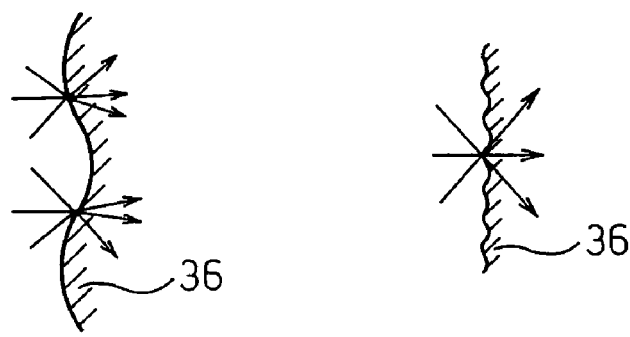
FIGS. 14A and 14B are partial enlarged views of a light-guiding plate of FIG. 13.

FIGS. 14A and 14B are partial enlarged views of a light-guiding plate of FIG. 13. FIG. 14A is a view showing the projections or depressions 36 enlarged. The light striking the incident surface 18 is refracted at the projections or depressions 36 and proceed in the light-guiding plate 12 while being enlarged in angular range. FIG. 14B is a view showing macroscopically the projections or depressions 36. The light striking the incident surface 18 proceeds in the light-guiding plate 12 while being enlarged in angular range as a whole in the projections or depressions 36.

Figure 15:
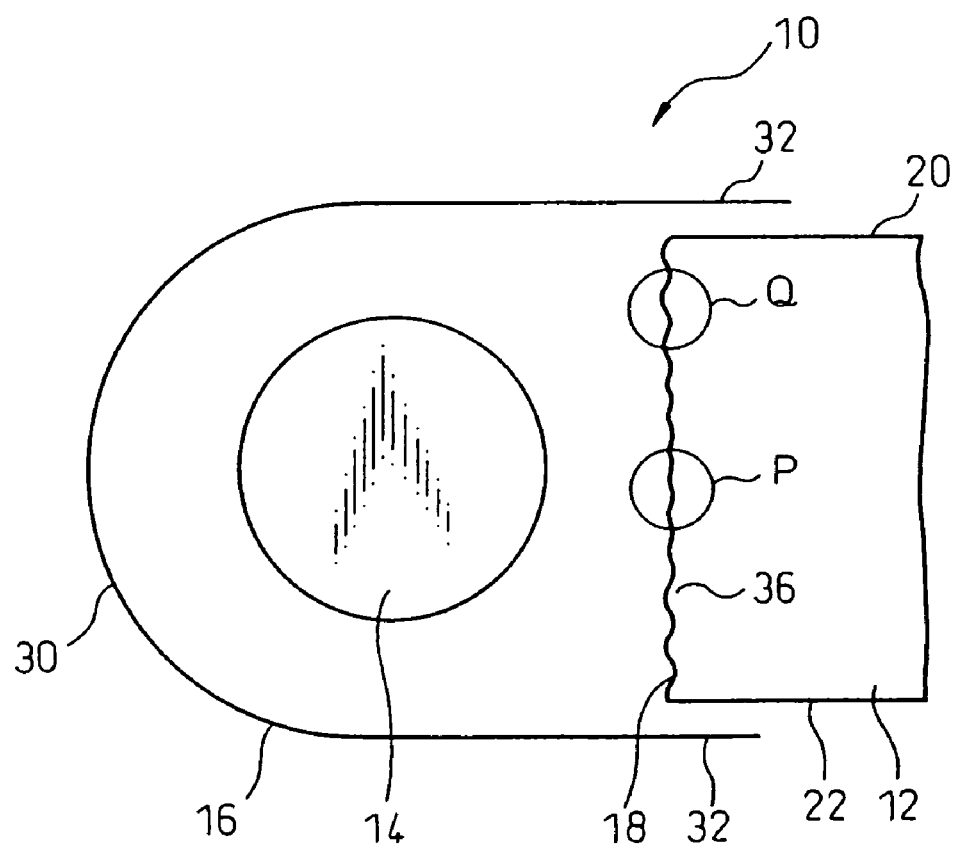
FIG. 15 is a view of a modification of the light-guiding plate of FIG. 13.
Figure 16A:
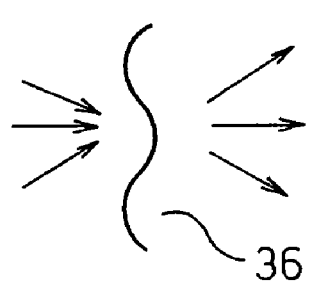
FIGS. 16A and 16B are partial enlarged views of a light-guiding plate of FIG. 15.
Figure 16B:
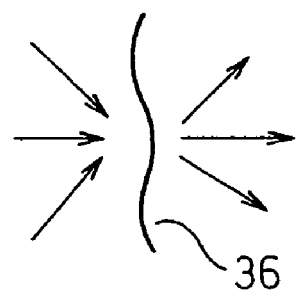

FIG. 15 is a view of a modification of the light-guiding plate 12 of FIG. 13. FIGS. 16A and 16B are partial enlarged views of a light-guiding plate of FIG. 15. FIG. 16A is a view showing the enlarged projections or depressions 36 in the center P of FIG. 15. FIG. 16B is a view showing the enlarged projections or depressions 36 at the top and bottom ends Q of FIG. 15.

In this example, in the same way as the example of FIG. 13, a plurality of projections or depressions 36 are formed along the long side direction of the incident surface 18. When viewed by the short side direction of the incident surface 18, they are formed as wavy curves. Further, the projections or depressions 36 are shaped so that the more to the center close to the light source 14 where the angle of the directly striking light is large, the smaller the amplitude of the wavy curves (the flatter the curves), the smaller the change in inclination, and the closer to a flat surface, while the more to the top and bottom ends far from the light source 14 where the angle of the directly striking light is small, the larger the amplitude of the wavy curves and the larger the change in inclination and so that the angular distribution of the light striking the light-guiding plate 12 does not change depending on the position of the incident surface 18. By doing this, strong light heads to regions conventionally becoming dark lines and the unevenness of bright lines and dark lines is reduced.

Figure 17:
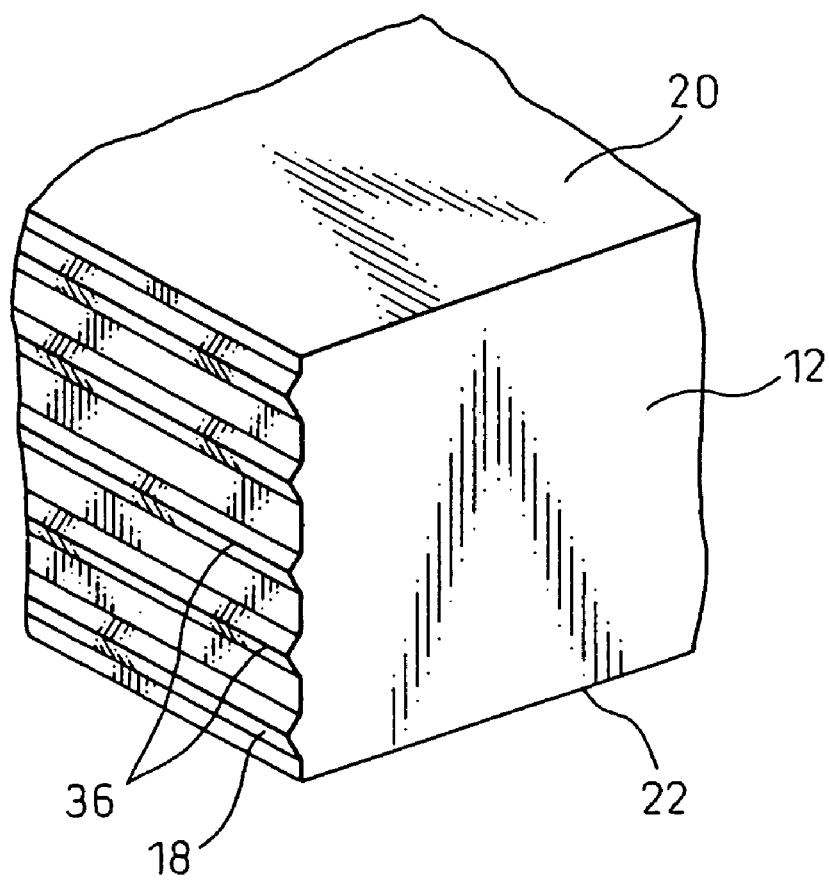
FIG. 17 is a view of a modification of the light-guiding plate of FIG. 8.

FIG. 17 is a view of a modification of the light-guiding plate 12 of FIG. 8. In the example of FIG. 8, a plurality of projections or depressions 36 are formed as round-shaped section projections formed along the long side direction of the incident surface 18, but in this example, a plurality of projections or depressions 36 are formed as V-shaped section projections formed along the long side direction of the incident surface 18. The V-shaped section projections extend long straight in parallel. For example, the vertical angle of the V-shaped section projections is 90 degrees, the depth is 25 µm, and the interval is 100 µm. Of course, the heights or intervals of the sectional shapes can be changed considering the thickness, working conditions (for example, press forming), etc. of the light-guiding plate 12. The shape can also be made a continuous sawtooth shape. The action of the light-guiding plate 12 is similar to the action of the light-guiding plate 12 of FIG. 8.

Figure 18:
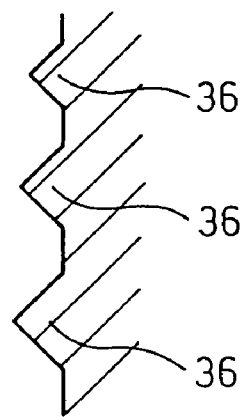
FIG. 18 is a view of a modification of the light-guiding plate of FIG. 17.

FIG. 18 is a view of a modification of the light-guiding plate 12 of FIG. 17. The shape and pitch of the plurality of projections or depressions 36 of the incident surface 18 of the light-guiding plate 12 of FIG. 17 can be changed to those of the plurality of projections or depressions 36 of the incident surface 18 of the light-guiding plate 12 of FIG. 12 and FIG. 15. In FIG. 18, in the projections or depressions 36 formed as projections of the V-sectional shape, the vertical angle of the V-shaped section projections is 90 degrees to 150 degrees, preferably 120 degrees. The V-shaped section projections are formed at intervals of 0.01 to 0.1 mm. The heights of the V-shaped section projections are adjusted so that the lengths of the flat surfaces in the short-side direction of the incident surface 18 between the V-shaped section projections becomes 20 to 80% with respect to the intervals of the V-shaped section projections. For example, the thickness of the light-guiding plate 12 is 2 mm, and 40 of the V-shaped section projections are formed at a pitch of 50 µm. The height of the V-shaped section projections positioned at the top and bottom ends of the incident surface 18 of the light-guiding plate 12 is about 20 µm, while the height of the projections is reduced the closer to the center of the incident surface 18 of the light-guiding plate 12. The action of the light-guiding plate 12 is similar to the action of the light-guiding plate 12 of FIG. 12.

Figure 19:
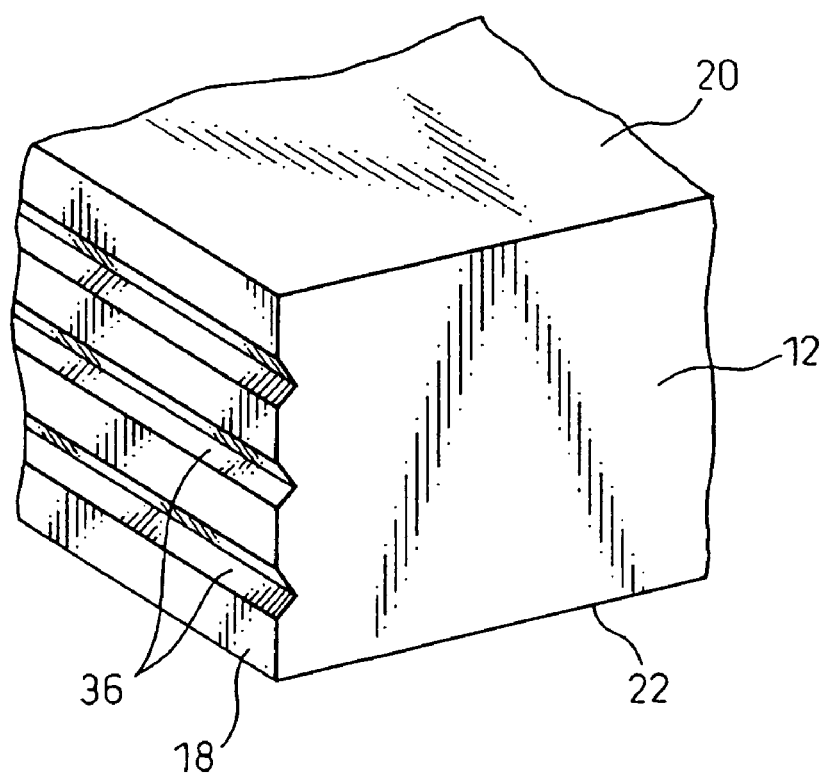
FIG. 19 is a view of a modification of the light-guiding plate of FIG. 17.

FIG. 19 is a view of a modification of the light-guiding plate 12 of FIG. 17. In this example, the plurality of projections or depressions 36 of the incident surface 18 of the light-guiding plate 12 are formed as V-shaped section grooves formed along the long-side direction of the incident surface 18. The action of the light-guiding plate 12 is similar to the action of the light-guiding plate 12 of FIG. 8. Note that the projections or depressions 36 shown from FIG. 8 to FIG. 15 may also be formed as depressions formed along the long-side direction of the incident surface 18.

Figure 20:
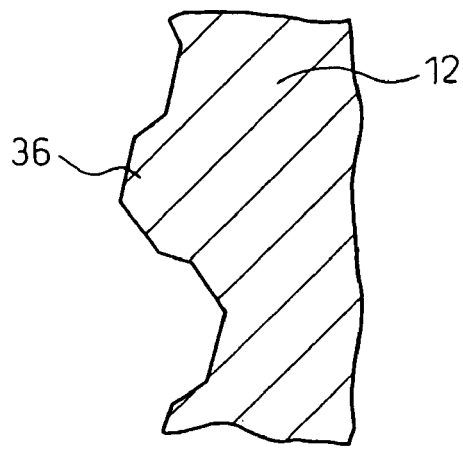
FIG. 20 is a view of a modification of the light-guiding plate of FIG. 17.

FIG. 20 is a view of a modification of the light-guiding plate 12 of FIG. 17. In this example, the plurality of projections or depressions of the incident surface 18 of the light-guiding plate 12 are formed in sectional projecting shapes or sectional groove shapes by combining a plurality of planes. The action of the light-guiding plate 12 is similar to the action of the light-guiding plate 12 of FIG. 8.

The sectional shape of the plurality of projections or depressions 36 of the incident surface 18 of the light-guiding plate 12 may be a curved shape such as a sine wave curve. Further, it may be made a depressed prism. Further, it need not be a prism, but also may be made an arc sectional shape. In this case, the curve may be formed approximately by a plurality of lines.

Figure 21:
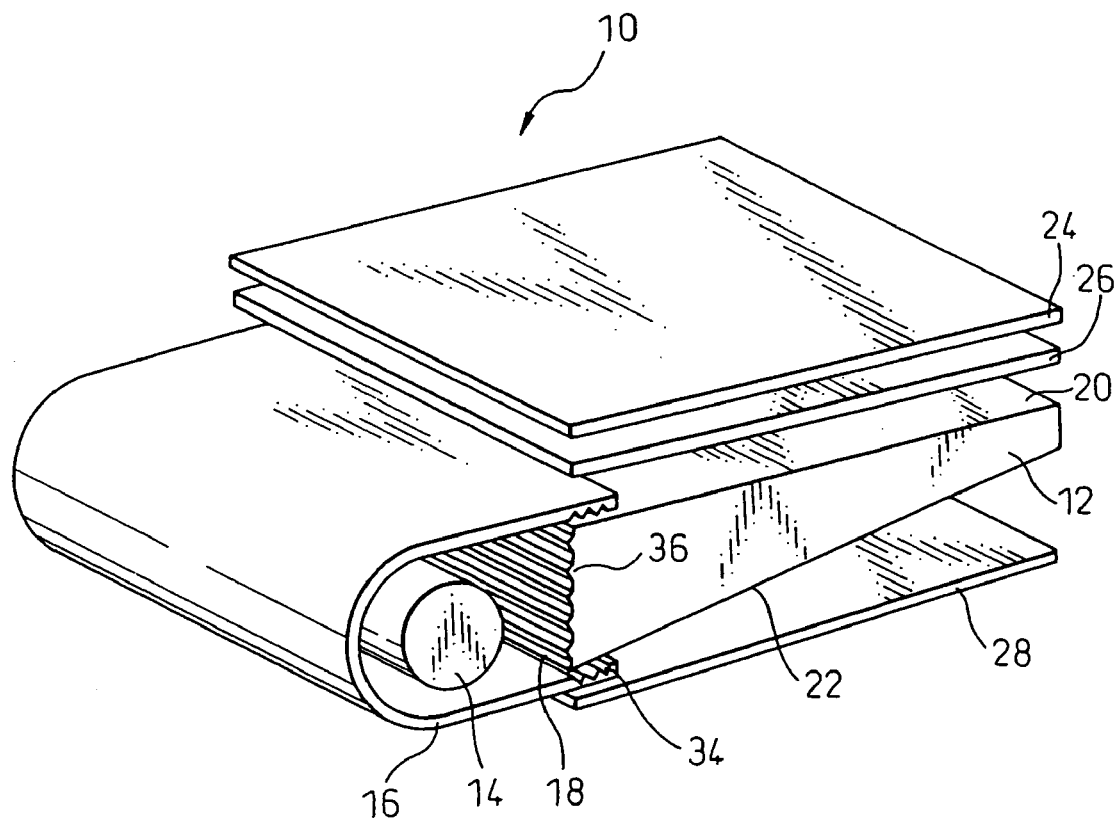
FIG. 21 is a schematic sectional view of an example of a light of the present invention.

FIG. 21 is a schematic sectional view of another example of the lighting device 10 of the present invention. The lighting device 10 is comprised of a light-guiding plate 12, a rod-shaped light source 14 comprised of a cold cathode fluorescent lamp arranged at one side part of the light-guiding plate 12, and a reflector 16 covering the light source 14. The light-guiding plate 12 has an incident surface 18 extending long parallel to the light source 14, an emission surface 20 substantially perpendicular to the incident surface 18, and a reflection surface 22 at the side opposite to the emission surface 20. Further, the diffusion plate 24 and prism sheet 26 or other light adjusting sheet are arranged at the emission surface 20 side of the light-guiding plate 12, while the reflection sheet 28 is arranged at the reflection surface 22 side of the light-guiding plate 12. The reflector 16 has a curved part covering the light source 14 and a pair of end parts 32 extending long in parallel at the two sides of the curved part 30. The end parts 32 extend over the incident surface 18 of the light-guiding plate 12 to partially overlap the light-guiding plate 12.

In the lighting device 10 of FIG. 21, the light-guiding plate 12 has a plurality of projections or depressions 36 shown from FIG. 8 to FIG. 20 at the incident surface 18, while the reflector 16 has a plurality of projections or depressions 34 shown in FIG. 2 and FIG. 3 at the inside surface of the end parts 32. Therefore, the light 10 of FIG. 21 has together the features of the reflector explained previously and the features of the light-guiding plate 12 explained previously. Further, the projections or depressions 36 of the light-guiding plate 12 refract the light toward the emission surface 20 and reflection surface 22, so the incidence angle of the light with respect to the emission surface 20 becomes larger and light can be emitted by a large angle at a position close to the incident surface 18 of the emission surface 20. The projections or depressions 34 of the reflector 16 not only prevent the bright lines explained with reference to FIG. 5 to FIG. 7, but also prevent the occurrence of bright lines occurring when light refracted by the projections or depressions 36 of the light-guiding plate 12 is emitted from the emission surface 20.

Figure 22:
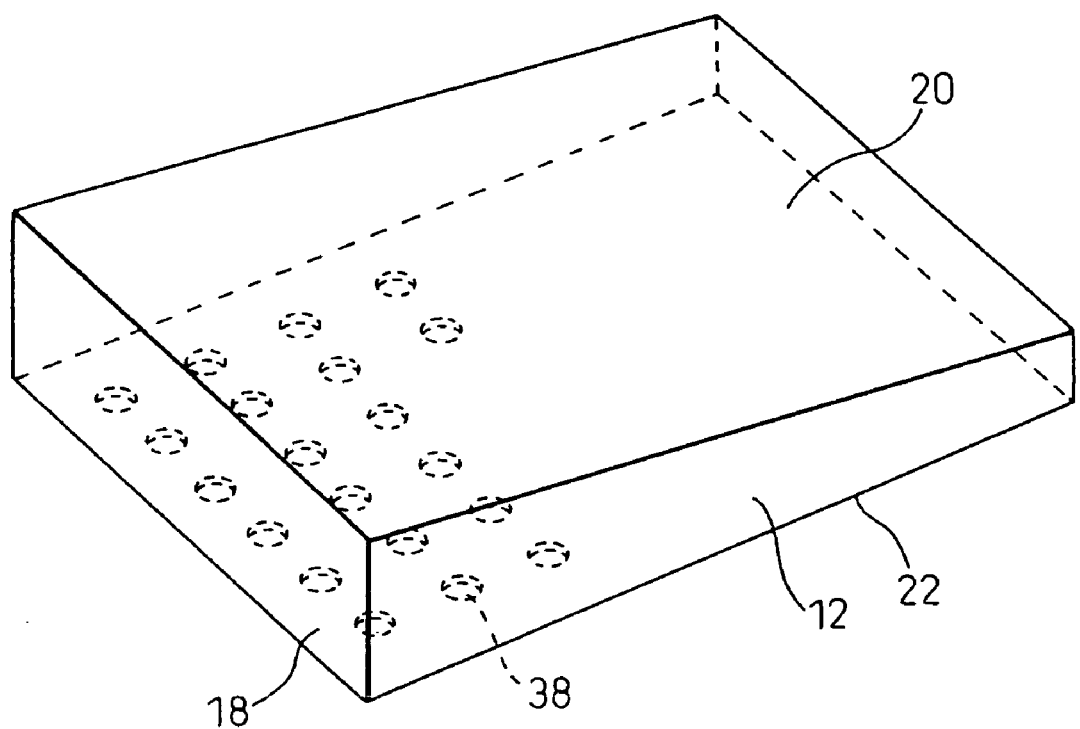
FIG. 22 is a view of a modification of a light-guiding plate.

FIG. 22 is a view of a modification of a light-guiding plate 12. In this example, the light-guiding plate 12 is formed with a microlens array 38 comprised of spherical depressions arranged at the reflection surface 22. The microlens array 38 is provided instead of the dots 21 of the diffusion material and assists the emission of light proceeding through the light-guiding plate 12 from the emission surface. This microlens array 38 is formed so as to become denser the further from the incident surface. Light is emitted uniformly at far locations and close locations from the incident surface 18. Note that the incident surface 18 is provided with a plurality of projections or depressions 36 shown from FIG. 8 to FIG. 20. Instead of the microlens array 38, it is also possible to use a microlens array comprised of spherical projections.

Figure 23:
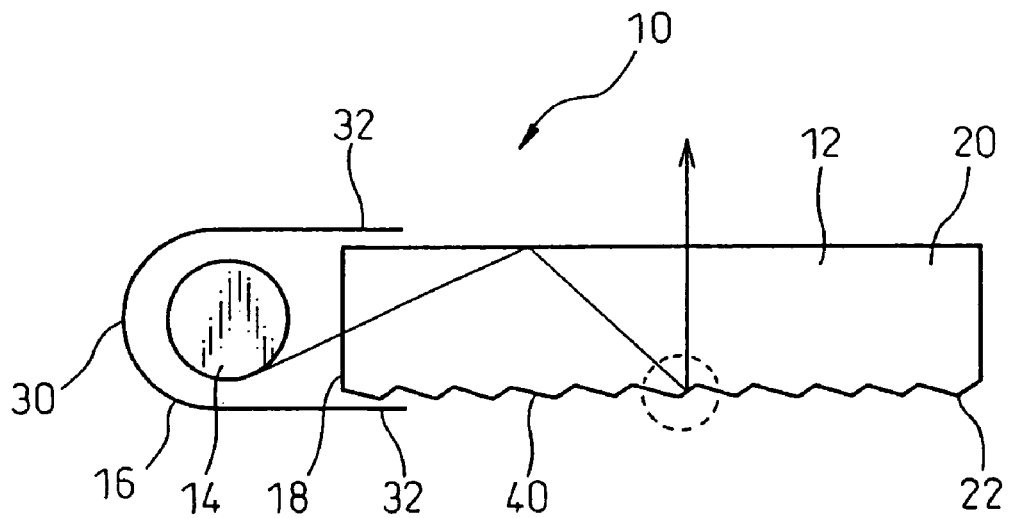
FIG. 23 is a view of a modification of a lighting device.
Figure 24:
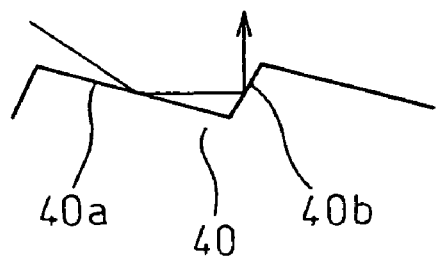
FIG. 24 is a partial enlarged view of a prism array of FIG. 23.

FIG. 23 is a view of a modification of the light 10. In this example, the light-guiding plate 12 is provided at the reflection surface 22 with a prism array 40 comprised of prisms formed continuously in parallel to the longitudinal direction of the incident surface 18. FIG. 24 is a partially enlarged view of the prism array 40 of FIG. 23. For example, it is possible to make the interval of the prisms 0.1 to 0.5 mm, make the inclination of the angle of the inclined surface (a surface) 40a facing the opposite side of the incident surface of the prism with respect to the emission surface 20 0 to 5 degrees, make the inclination of the inclined surface (.beta. surface) facing the incident surface side with respect to the emission surface 20 40 to 50 degrees, make the guided light be fully reflected at the beta. surface 40b, and make it be emitted in the normal direction of the emission surface 20.

Figure 25:
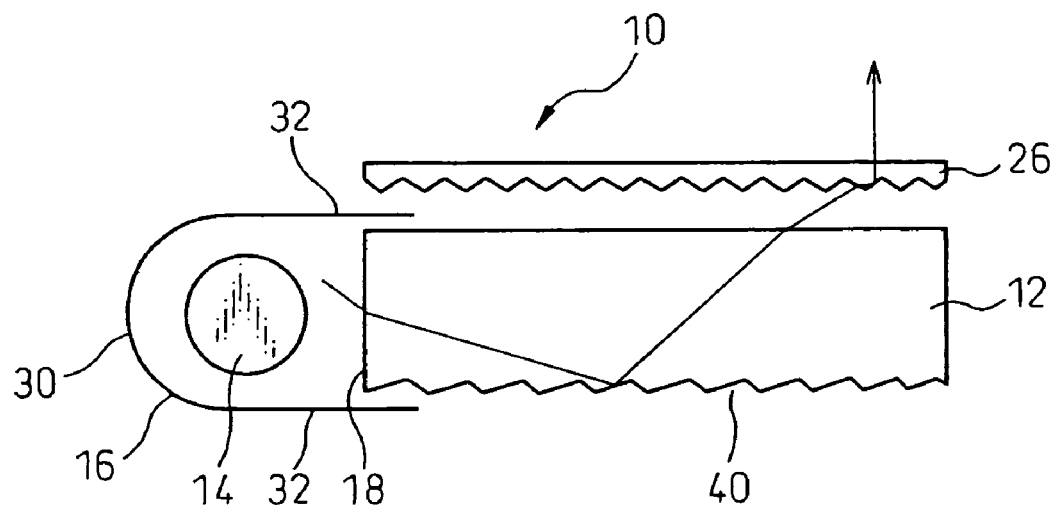
FIG. 25 is a view of a modification of a lighting device.
Figure 26:
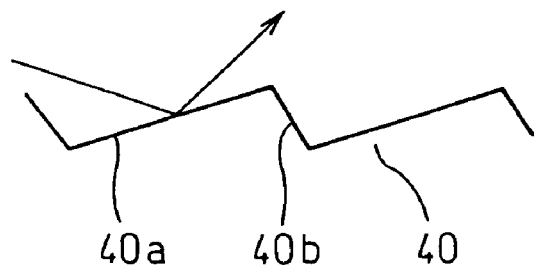
FIG. 26 is a partial enlarged view of the prism array of FIG. 25.

FIG. 25 is a view of a modification of the lighting device 10. FIG. 26 is a partial enlarged view of the prism array 40 of FIG. 25. In this example, the a surface 40a and the .beta. surface 40b of the prism array 40 are switched from those of FIG. 23, the guided light is fully reflected at the a surface 40a, the light is emitted in a direction inclined 60 to 70 degrees from the normal of the emission surface 20 and is refracted in the normal direction of the emission surface 20 by the prism sheet 26.

Figure 27:
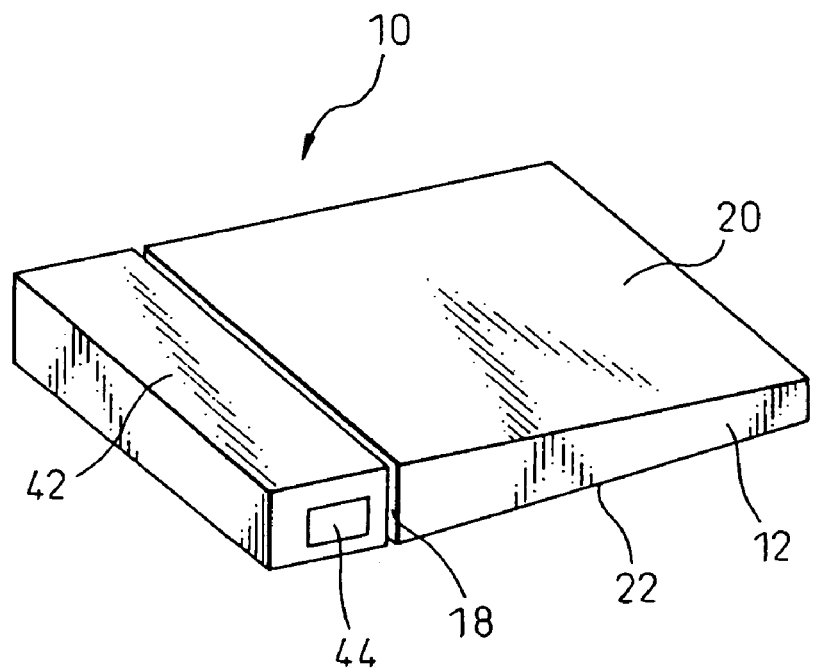
FIG. 27 is a view of a modification of a lighting device.

FIG. 27 is a view of a modification of the lighting device 10. In this example, instead of the combination of the light source 14 and the reflector 16, a light type comprised of point light sources, that is, LEDs 44, arranged at the two sides of a long light-guiding member 42 is used: The light-guiding member 42 is arranged at one side part of the light-guiding plate 12. Light emitted from the LEDs passes through the light-guiding member 42 and strikes the light-guiding plate 12. The incident surface 18 of the light-guiding plate 12 is formed with a plurality of projections or depressions 36 shown from FIG. 8 to FIG. 20. The action of this light is similar to the action of the light 10 of FIG. 8.

Figure 28:
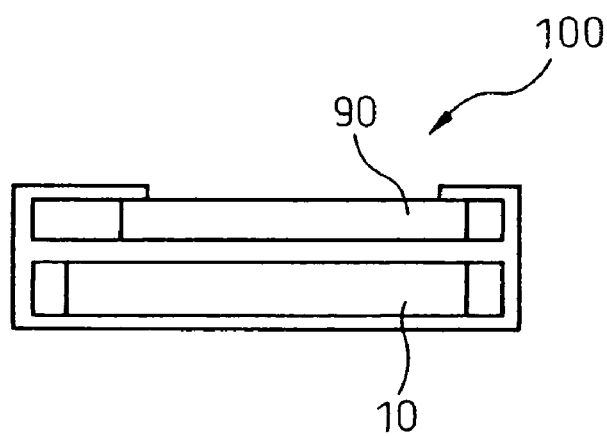
FIG. 28 is a view of a display of an embodiment of the present invention.

FIG. 28 is a view of a display device 100 of an embodiment of the present invention. The liquid crystal display device 100 includes the lighting device 10 and a display element 90 of any of FIG. 1 to FIG. 27. The lighting device 10 is used as a side light type backlight in the display device 100. Preferably, the display element 90 is comprised of a liquid crystal panel.

FIG. 29 is a view of a modification of the lighting device 10 of the present invention. In this example, the incident surface 18 of the light-guiding plate 12 has projections or depressions 36, while the reflection surface 22 is provided with a prism array 40 comprised of prisms continuously formed parallel to the longitudinal direction of the incident surface 18. The guided light is fully reflected at the a surface 40a and the light emitted in a direction inclined by 60 to 70 degrees from the normal of the emission surface 20 and is refracted in the normal direction of the emission surface 20 by the prism sheet 26. When combining the incident surface 18 and reflection surface 22, as shown in FIG. 30, as a result of a corroborative experiment, it is possible to obtain a substantially uniform luminance distribution from near the light source to far from it. Further, if using a reflection sheet 28 on which a high regular reflectance aluminum, silver alloy, or other metal is vapor deposited or a metal film is bonded, the diffusion due to the reflection sheet becomes smaller and more light can be provided to the prism.

FIG. 30 shows the results of an experiment corroborating the luminance distribution in a direction perpendicular from the light source due to differences in processing of the incident surface 18. The reflection surface 22 of the light-guiding plate uses a prism light-guiding plate (prism array 40) and emits light inclined 60 to 70 degrees from normal from the emission surface 20. The emitted light is bent in the normal direction by the downward facing prism lens sheet 26. When the treatment of the incident surface 18 is flattening, the drop in luminance at the 20 mm near side near the light source is remarkable. Further, when the treatment of the incident surface 18 is diffusion treatment, the luminance of at the 20 mm side near the light source is improved, but the amount of light heading to the inside is small and the luminance far away ends up falling. Further, when the treatment of the incident surface 18 is prismatic, it is possible to obtain a substantially uniform luminance distribution from near the light source to far from it.

FIG. 31 is a view of a modification of the light-guiding plate 12 of the present invention. The emission surface 20 of the light-guiding plate 12 is provided with a triangular shaped prism 41. Due to the effects of this prism, it is possible to concentrate light of a direction parallel to the longitudinal direction of the incident surface.

Next, the features of the prism sheet will be explained. In the present invention, the features of the reflector and/or the features of the light-guiding plate explained above can be combined with the features of the prism sheet explained from here.

FIG. 32 is a perspective view of a transmission type liquid crystal display device (LCD) 100 in a portable electronic device according to an embodiment of the present invention such as a notebook type personal computer or PDA (personal digital assistant) and shows a microprocessor 80, a light source controller 82, and a light source drive 84. The liquid crystal display device 100 includes a transmission type liquid crystal panel 90 and a planar light source device or backlight 110 arranged in back of it. For the planar light source device 110, typically a white cold cathode fluorescent lamp (CCFL) or a rod-shaped light source such as a fluorescent light is used. As a typical configuration, the light source may also be an array of LEDs arranged on a line.

The light source drive 84 is connected to an external AC power supply (not shown) and DC battery (not shown). The light source controller 82 starts up the light source drive 84 in accordance with an instruction INST from the microprocessor or microcontroller 80 of an electronic device (not shown).

In FIG. 32, the planar light source device 110 includes a rod-shaped light source 14, a schematically wedge-shaped light-guiding plate 12 having two pairs of sides, each pair of opposite sides being substantially parallel, a prism sheet 26 arranged in front of the light-guiding plate 12, and a diffusion sheet 24 arranged between the prism sheet 26 and liquid crystal panel 90. The planar light source device 110 reflects and refracts the light from the rod-shaped light source 14 by the light-guiding plate 12 and the prism sheet 26 and radiates it toward the liquid crystal panel 90. The light-guiding plate 12, prism sheet 26, diffusion sheet 24, and liquid crystal panel 90 are arranged so as to substantially contact each other, but in this figure, to clarify the structures, they are shown with intervals. Each of the light-guiding plate 12, the prism sheet 26, the diffusion sheet 24, and the liquid crystal panel 90 are rectangular shapes of an area of about 200 cm.sup.2 of for example a Y-direction length Ly of about 10 cm.times.X-direction length Lx of about 20 cm.

In FIG. 32, the direction from the light source 14 to the light-guiding plate 12 is the X-direction, the longitudinal direction of the light source 14 is the Y-direction, and the direction from the light-guiding plate 26 to the transmission type liquid crystal panel 90 is the Z-direction.

In FIG. 32, the light source 14 is arranged at the left side view of the light-guiding plate 12 and radiates light toward the light-guiding plate 12. Therefore, the light source 14 is a side light of the planar light source device 110. The light source 14 is surrounded by the reflector 16 except for the light-guiding plate 12 side. The reflector 16 is typically an aluminum plate cover the inside surface of which is silver plated or covered by a mirror film. In the figure, part of the reflector 16 is not shown to clarify the structure.

As shown in FIG. 32, the light-guiding plate 12 is a substantially wedge shape on the XZ plane, that is, the back surface is inclined and becomes gradually thinner along the X-direction. The inclination angle .alpha. is in a range of 0 to 5 degrees. The light-guiding plate 12 typically is made of an acrylic resin, has a thickness of a greatest thickness of about 2 mm at the position closest to the light source 14, and has a thickness of the smallest thickness of about 1 mm at the position farthest from the light source 14.

The back surface of the light-guiding plate 12 has a parallel plurality of elongated triangular prism parts 132 formed by a plurality of grooves and extending in the Y-direction arranged in the X-direction. The back surface of the light-guiding plate 12 is covered by a known reflection sheet or reflection plate 28. The front surface of the light guiding plate 12 has a parallel plurality of elongated triangular prism parts 134, formed by a plurality of grooves and extending in the X-direction, arranged in the Y-direction.

Each back surface prism part 132 of the light-guiding plate 12 refracts light in the X-direction from the light source 14 inside the light-guiding plate 12 toward the diffusion sheet 24 of the front surface by approximately 30 degrees, that is, by an emission angle of about 60 degrees, with respect to the front surface of the light-guiding plate 12. By arranging the diffusion sheet 24 between the prism sheet 26 and the liquid crystal panel 90, the luminance of the display as a whole becomes somewhat higher compared with the case of arranging it between the light-guiding plate 12 and the prism sheet 26. The front surface prism part 134 condenses the emitted light heading toward the prism sheet 26 further in the Y-direction.

The prism sheet 26 refracts light striking the back surface at substantially 30 degrees, that is, an angle of about 60 degrees, and passing through the back surface, by the prism part 134 in the Z-direction substantially perpendicular to the front surface and radiates it from the front surface toward the diffusion sheet 24. The thickness of the prism sheet 26 is preferably a value in the range of about 150 µm to 250 µm, for example, about 200 µm.

The prism sheet 26 is also called a "lenticular lens sheet" and has a typically flat front surface at the side close to the liquid crystal panel 90 and a back surface having a plurality elongated triangular and quadrangular prism parts 142 parallel to the longitudinal direction of the light source at the side close to the light-guiding plate 12, that is, the Y-direction. The inclined surfaces of the triangular and quadrangular prism parts 142 are inclined by an angle in the angular range of an angle of 30 degrees to 35 degrees, for example, .+-.about 32.4 degrees, with respect to the line perpendicular to the plane of the flat front surface. The prism sheet 26 refracts and reflects the light striking the back surface by about 30 degrees (angle of incidence to plane of about 60 degrees) with respect to the front surface and radiates it from the front surface toward the diffusion sheet 24 in the substantially perpendicular direction.

The diffusion sheet 24 diffuses light in the generally Z-direction from the prism sheet 26 at an angle to enlarge the viewing angle of the liquid crystal display device 100.

Figure 33A:
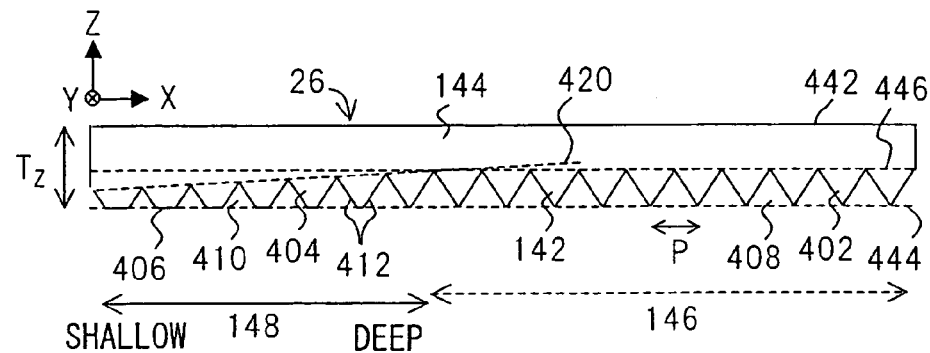
FIGS. 33A to 33D show structures of a prism sheet according to the present invention and a modifications of the same.
Figure 33B:
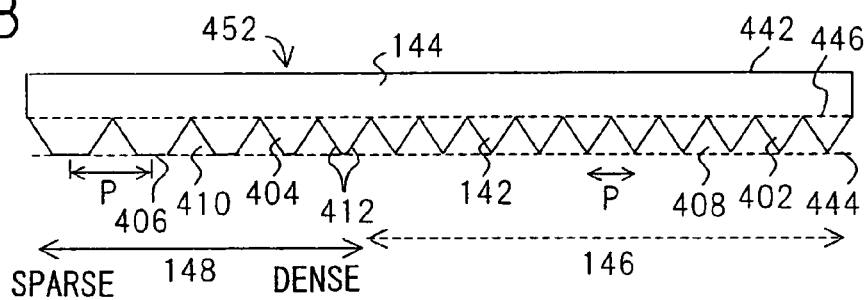
Figure 33C:
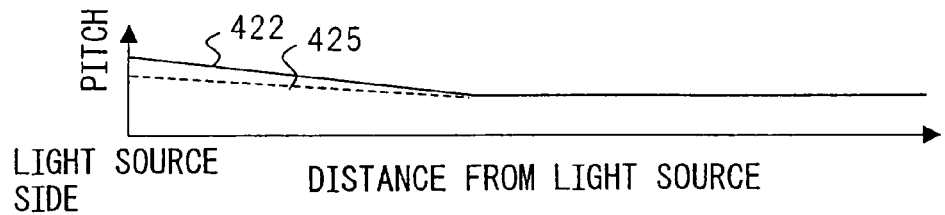
Figure 33D:
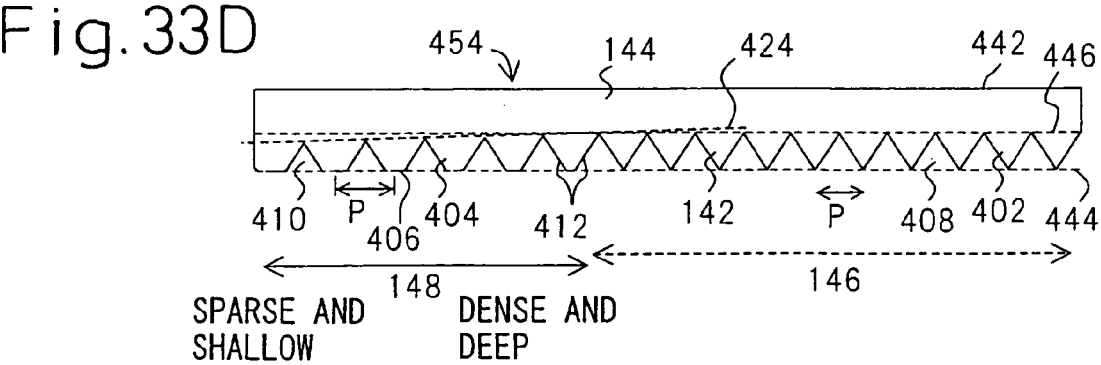

FIGS. 33A, 33B, and 33D show the structures of the prism sheet 26 according to the present invention and the modified prism sheets 452 and 454. FIG. 33C shows the distribution of the pitch P of the prism parts 142 of the FIGS. 33B and 33D. The plane 444 of the back surface shown by the peak line positioned at the bottom parts of FIGS. 33A, 33B, and 33D of the prism parts 142 in the prism sheets 26, 452, and 454 or the broken line passing through the bottom surface is parallel to the plane 442 of the flat front surface.

In FIG. 33A, the prism sheet 26 typically includes a PET film part 144 and a plurality of prism parts 142 with side surfaces affixed to the back surface 446 of this film part 144. The thickness of the film part 144 is typically about 100 µm. The prism parts 142 typically are formed by a UV (ultraviolet) curing resin. The thickness or height of the prism parts 142 is typically about 100 µm. The prism parts 142 according to the embodiment of the present invention include a large number of triangular prism parts 402 of the same dimensions and shapes arranged at a broad region 146 at the side far from the light source 14 and a plurality of triangular or quadrangular prism parts 1404 of different dimensions and shapes arranged in the narrow region 48 at the side close to the light source 14. The region 148 is the region for improving the unnecessarily high luminance near the light source 14. The length in X-direction of the region 148 is a value in the range of about 3 to about 10 times the maximum thickness at the light source 14 side of the light-guiding plate 12, for example, may be 6 mm for a maximum thickness of 2 mm of the light-guiding plate 12.

The plurality of prism parts 402 in the region 146 have dimensions and shapes similar to ordinary ones and are separated from each other by a plurality of similar grooves 408. The prism parts 402 have two inclined surfaces. The plurality of prism parts 404 at the region 148 are separated by the plurality of different grooves 410. The prism parts have two inclined surfaces 412 and a flat surface 406. Each flat surface 406 is arranged between two inclined surfaces inclined in opposite directions. The plurality of flat surfaces 406 are substantially parallel to the virtual plane passing through the inclined surfaces of the plurality of prism parts 402 and 404 and are substantially parallel to the surface of the light-guiding plate 12 at the prism sheet 26 side. These flat surfaces 406 are positioned on the bottom plane 444 of the prism sheet 26 in this drawing.

In a conventional prism, prism parts of the same dimensions and shapes as the prism parts 402 in the region 146 are also arranged at the region 148. Due to this, there was the defect that the luminance of the planar light source in the region of the distance about 3.5 times the maximum thickness of the light source 14 side of the light-guiding plate 12 became unnecessarily higher. Further, the high luminance near the light source 14 cannot be sufficiently lowered even if applying diffusion treatment with a prism part gradation in the region 148. This defect is eliminated by the structure of the prism parts 404 in the region 148 due to the present invention.

In the region 148 near the light source 14, the area of the individual inclined surfaces 412 of the individual prism parts 404 becomes smaller the closer to the light source 10, while the area of the individual flat surfaces 406 becomes larger the closer to the light source 14. In FIG. 33A, the pitch P of all of the prism parts 402 and 404 of the prism sheet 26 is equal. The top surfaces of the prism parts 404 or the baseline, that is, the valley line of the grooves 410, are positioned on the inclined plane 420. The depth of the individual grooves 410 becomes shallower the closer to the light source 10 in accordance with the region of the inclined plane 420, that is, the height of the individual prism parts 404 becomes lower the closer to the light source 14, while the width in the X-direction of the individual flat surfaces 406 becomes larger the closer to the light source 14, that is, the area of the individual flat surfaces 406 becomes broader. The height of the prism part 404 at the position closest to the light source at the region 148, that is, the depth of the grooves 410, is preferably a value in the range of 50 to 70% of the height of the prism part 402 in the region 146, that is, the depth of the groove 410, for example, 60%. In the region 148 near the light source 14, the ratio of the area of the inclined surfaces 412 per unit area is substantially gradually reduced the closer to the light source 14. Further, in the region 148 near the light source 14, the ratio of the area of the flat surfaces 406 with respect to the area of the inclined surfaces 412 per unit area becomes substantially gradually larger the closer to the light source 10.

In the planar light source device 110 of the above configuration, in the region 148 near the light source 14, part of the light radiated from the light-generating plate 12 toward the prism parts 404 is radiated in the generally Z-direction toward the diffusion sheet 24, while part of the remaining light radiated from the light-guiding plate 12 toward the prism part 404 is reflected toward the bottom right. Part of the light of the reflected remainder is reflected at the prism parts 132 at the back surface of the light-guiding plate 12, passes through the front surface of the light-guiding plate 12, is radiated at an inclination upward, and passes through the prism sheet 26 and is reflected in the inclined direction.

Figure 35A:
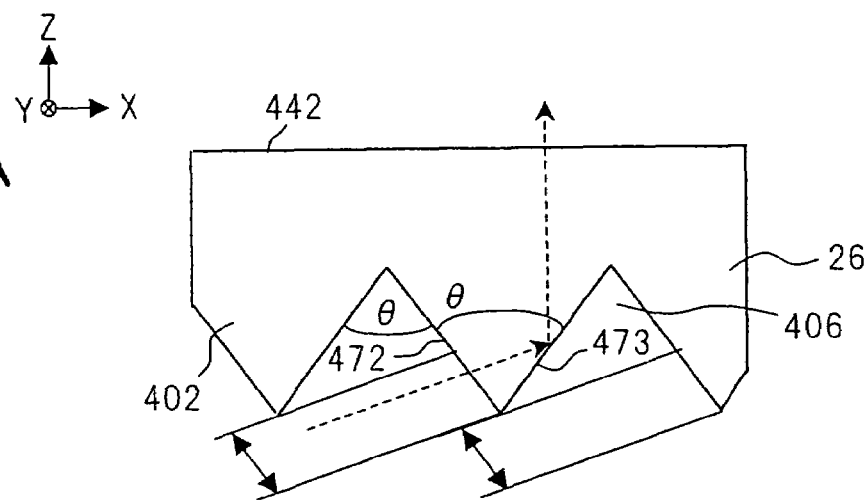
FIG. 35A shows the partially enlarged structure of prism parts at a region far from the light source.
Figure 35B:
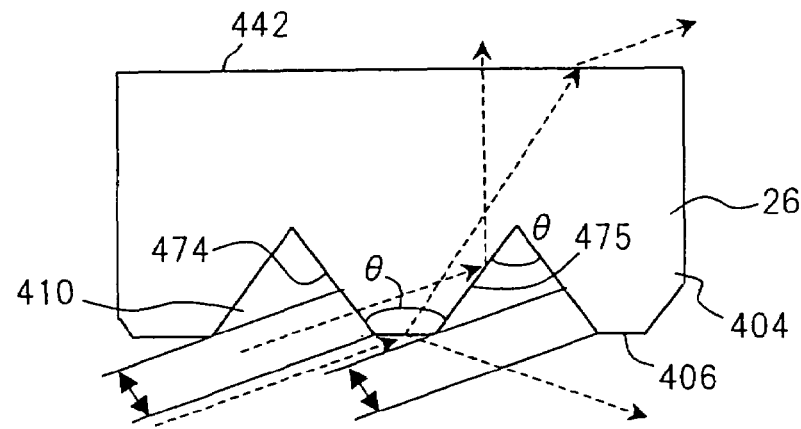
FIG. 35B shows the partially enlarged structure of prism parts at a region near the light source.

FIG. 35A shows the partially enlarged structure of a prism part 402 at the region 146 far from the light source 14. FIG. 35B shows the partially enlarged structure of a prism part 404 at a region 148 near the light source 14. FIGS. 35A and 35B are useful for explanation of the propagation of light by the prism sheet 26.

In FIG. 35A, the angle .theta. formed by the adjoining inclined surfaces 472 and 473 is a value in the range from 60 degrees to 70 degrees, for example, is 65 degrees. As shown by the broken line arrows, the majority of the light radiated from the light-guiding plate 12 in the top right direction toward the prism part 402 of the prism sheet 26 passes through the inclined surface 472, is reflected at the inclined surface 473, and is radiated upward perpendicular to the plane 442 of the front surface.

In FIG. 35B, the angle .theta. formed by the adjoining inclined surfaces 474 and 475 is a value in a range of 60 degrees to 70 degrees, for example, is 65 degrees. As shown by the broken line arrows, part of the light radiated from the light-guiding plate 12 toward the prism sheet 26 in the top right direction passes through the inclined surface 474, is reflected at the inclined surface 475, and is radiated upward generally perpendicular to the plane 442 of the front surface. The ratio of the light radiated upward with respect to the inclined light is reduced the closer to the light source 14 in accordance with the change in size of the individual inclined surfaces 474 and 475 corresponding to the distance from the light source 14. Part of the remaining light is reflected toward the bottom right by the flat surface 406, while another part passes through the flat surface 406 and prism sheet 26 and is radiated to the top right at an inclination. The light radiated upward in the Z-direction is reduced by exactly this amount. The ratio, with respect to the incident light, of the light reflected toward the bottom right and the light passing through the prism sheet 26 and radiated toward the top right increases the closer to the light source 14 in accordance with the change in size of the individual flat surfaces 406 corresponding to the distance from the light source 10.

FIG. 33B shows a prism sheet 452 according to another embodiment of the present invention. FIG. 33C shows the distribution of the length of the pitch P of the prism parts 142 in the X-direction. In FIG. 33B, the pitch P of the prism parts 402 and the pitch P of the prism parts 404 are different. The individual pitch P between the prism parts 404 becomes larger the closer to the light source 10 as shown by the solid line 422 in FIG. 33C. The heights of the prisms 402 and 404 are the same, that is, the widths and depths of the grooves 408 and 410 are the same. The area of the individual flat areas of the region 148 becomes larger the closer to the light source 14 in the same way as FIG. 33A. The individual inclined surfaces 412 in the region 148 become larger in interval and sparser in density the closer to the light source 14.

FIG. 33D shows a prism sheet 454 according to still another embodiment of the present invention. The prism sheet 454 has the features of both of the prism sheet 26 of FIG. 33A and the prism sheet 452 of FIG. 33B. That is, in the region 148 near the light source 10 of the prism sheet 454, the closer to the light source 14, the lower the height of the individual prism parts 404, the greater the pitch between the prism parts, the smaller the depth and width of the individual grooves 410, and the larger the area of the individual flat surfaces 406. The inclination of the inclined plane 424 including the valley line of the plurality of grooves 410 is smaller than the inclination of the plane 420 of FIG. 33A, while the inclination of the change of the pitch P between the prism parts 404 in the region 148 is shown by the broken line 425 in FIG. 33C and is smaller than the inclination of the change of the pitch shown by the solid line 422 in FIG. 33C.

Figure 34A:
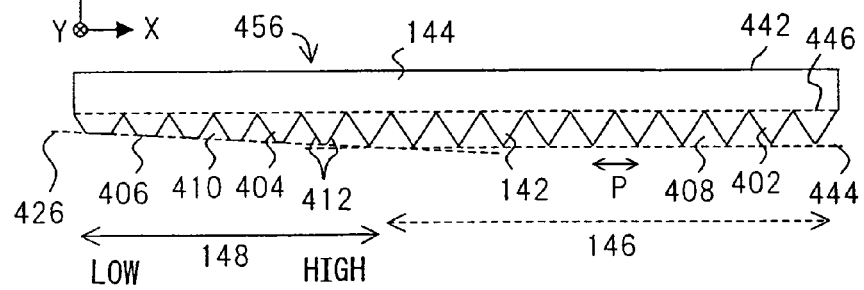
FIGS. 34A to 34C show prism sheets having still other structures modifying the prism sheet according to the present invention.
Figure 34B:
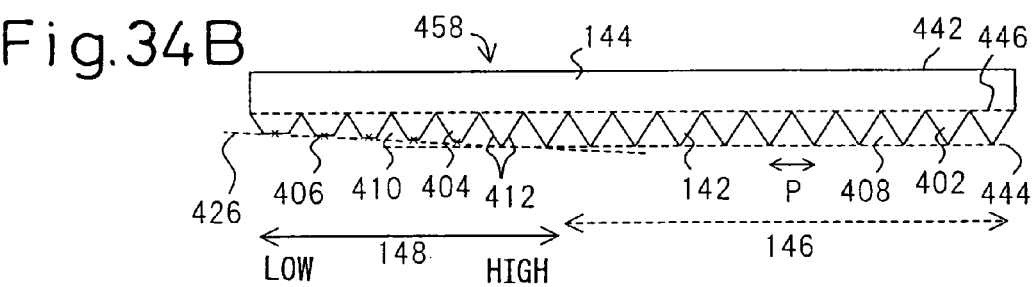
Figure 34C:
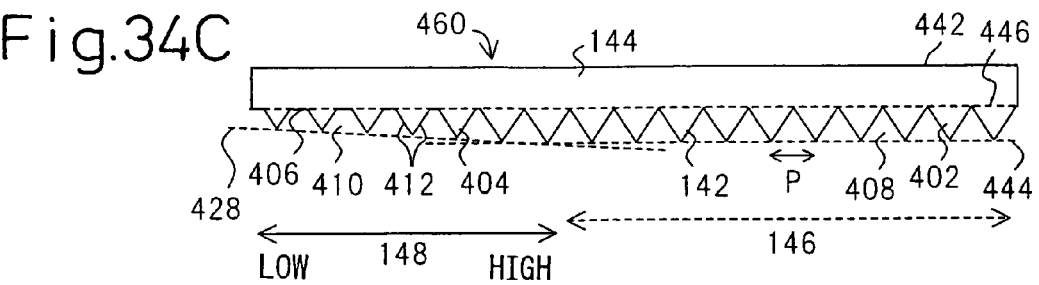

FIGS. 34A to 34C show the prism sheets 456, 458, and 460 having still other structures modified from the prism sheet 26 according to the present invention. The planes 426 and 428 shown by the valley line of the prism parts 404 or the broken lines passing through the bottom surfaces of the prism sheets 456, 458, and 460 are inclined. The pitch of the prism parts 404 is the same as the pitch of the prism parts 402.

In FIG. 34A, the prism parts 404 are shaped as a series of prism parts in the region 148 of the same dimensions and shapes as the plurality of prism parts 402 but with the bottom parts cut away along the inclined plane 426. Therefore, the flat surfaces 406 of the prism parts 404 in the region 148 are on the plane 426 inclined somewhat. The area of the individual flat surfaces 406 becomes larger the closer to the light source 10. The area of the individual inclined surfaces 412 becomes smaller than closer to the light source 14.

In FIG. 34B, the prism sheet 448 is corrected so that the individual flat surfaces 406 become parallel to the plane 144 of the front surface. The center line in the Y-direction of the flat surfaces 406 of the prism part 404 in the region 48 is on the inclined plane 426. The area of the individual flat surfaces 406 becomes larger the closer to the light source 14. The area of the inclined surfaces 412 of the individual prism parts 404 becomes smaller the closer to the light source 14.

In FIG. 34C, the prism sheet 460 is formed with dimensions and shapes of the prism parts 404 all triangular and with the parts of the bottom surfaces of the prisms 144 as flat surfaces 406 of the valleys of the grooves 410. The peak line or bottom surfaces of the prism parts 404 in the region 148 are on the inclined plane 428. The area of the individual flat surfaces 406 becomes larger the closer to the light source 14.

The area of the individual inclined surfaces 412 becomes smaller the closer to the light source 14.

Experts in this field clearly can freely combine the features of the prism sheets shown in FIGS. 33A to 33D and FIGS. 34A to 34C.

Figures 36A, 36B:
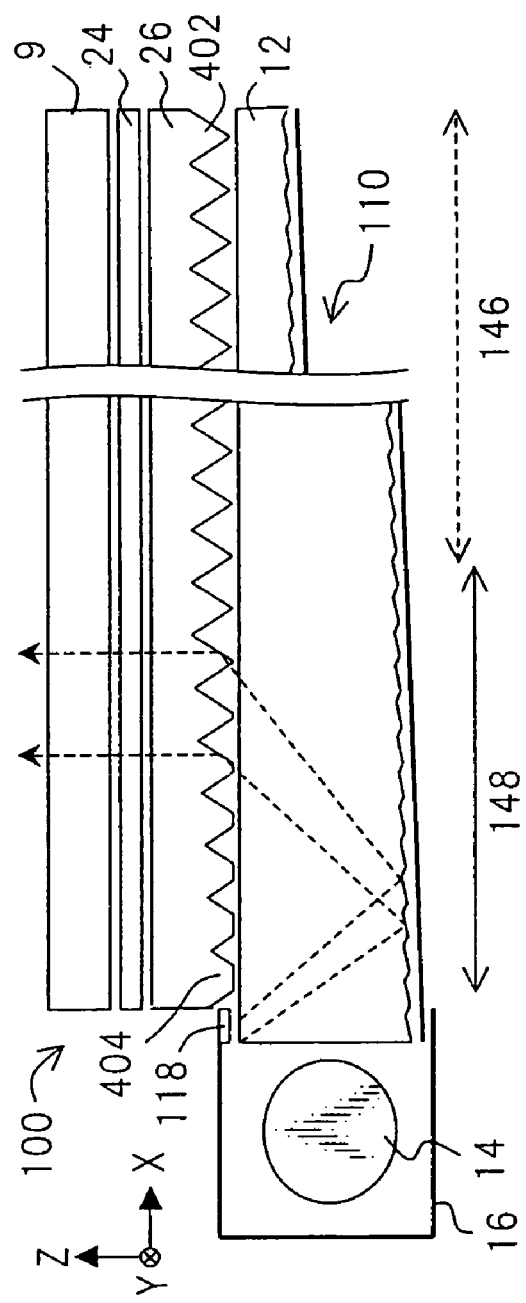
FIG. 36A is a side view of a planar light source device in the Y-direction.
FIG. 36B shows the luminance at a front surface side of a liquid crystal panel with respect to the distance from the light source in the X-direction.

FIG. 36A is a side view of a planar light source device 110 in the Y-direction. FIG. 36B shows the luminance at a front surface side of a liquid crystal panel 90 with respect to the distance from the light source in the X-direction. The light from the light source 14 is reflected in the generally inclined top right direction by the light-guiding plate 12, then the reflected light is refracted and reflected in the generally Z-direction by the prism sheet 261. The solid line curve 502 in FIG. 36B shows the distribution of the luminance of the planar light source using a conventional prism sheet having prism parts in the region 148 of the same dimensions and shapes as the prism parts 402 in the region 146. Compared with the curve 502, it is understood that the curve 504 has a generally uniform luminance due to the structure of the prism parts 404.

However, the curve 504 in FIG. 36B includes local non-uniformity of the luminance. For example, the luminance such as shown by the high luminance part 506 sometimes appears locally at the region 148. The inventors researched this and found that the bright line 502 is due to the light condensed at the mirror-like end at the prism sheet 26 side of the reflector 16 of the light source 14. Therefore, the mirror-like end is provided with a diffusion part 118 to which for example a white seal having diffusion ability is adhered or a coating is applied to reduce the luminance and thereby obtain a curve 508 with no local high luminance part 506.

FIG. 37A is a side view of a planar light source 110 having a prism sheet 26 treated for diffusion for making the luminance more uniform at the region 148 near the light source 10. FIG. 37B shows the degree of diffusion treatment with respect to the distance in the X-direction from the light source 14 at the prism sheet 26. The pitch P between the prism parts 404 at the region 148 at the light source 14 side is large, so stripes of noticeable brightness as shown by the stripes 506 in the curve 504 in FIG. 36B appear at the region 148 in some cases. These stripes of brightness can form the diffusion part 52 on the surface of the prism part 404 in the region 148 and/or can form the diffusion part 524 on the top surface of the prism sheet 26 corresponding to the prism part 404 to further locally diffuse the light and thereby make the luminance at the region 148 uniform.

As shown in FIG. 37B, the diffusion treatment makes the degree of diffusion greater the closer to the light source 14. The luminance of the planar light source 110 falls along with the degree of diffusion treatment. By reducing the luminance roughly by for exactly about 90% of the target amount of reduction by the shape of the prism explained relating to FIGS. 33A and 33B and 33D and FIGS. 34A to 34C and then finely adjusting the luminance by the diffusion treatment so as to reduce the luminance by for example the remaining about 10%, it is possible to obtain the desired uniformity of luminance across the entire liquid crystal panel 90. With just the diffusion treatment, it is not possible to sufficiently reduce the luminance in the region 148. With diffusion treatment, light is just partially attenuated. The excess light at the region 148 cannot be reflected toward the region 146 sufficiently.

For this diffusion treatment, fine particles are placed against the part of a negative (female) mold (not shown) corresponding to that part, where the diffusion treatment is to be performed, of the surface of the prism parts 404 of the prism sheet 26 and/or top surface of the film part 144 to form scratches or depressions. The amount of the scratches or depressions increases in accordance with the length of the time the particles are applied and the degree of diffusion is adjusted. A diffusion part 522 and/or 524 including large numbers of fine projections is formed at the surface of the prism sheet 26 corresponding to the scratches or depressions.

FIG. 38A is a side view of a planar light source 110 having a prism sheet 26 given a diffusion treatment 522 for making the luminance more uniform at the region 148 near the light source and a diffusion treatment 526 for enlarging the viewing angle. In this figure, the diffusion sheet 24 at FIG. 37A is removed. Instead of using the diffusion sheet 24, diffusion treatment 526 is given. In this case, the diffusion sheet 24 is not needed, so the structure of the planar light source 110 becomes simpler. FIG. 38B shows the distributions 542 and 544 of the degrees of the diffusion treatments 522 and 526 with respect to the distribution from the light source 14 in the X-direction in the prism sheet of FIG. 38A.

The solid line 544 in FIG. 38B expresses the distribution of the degree of diffusion of the diffusion treatment 526 at the surface of the front surface of the prism sheet 26. The degree of diffusion of the diffusion treatment 526 is substantially constant across the entire prism sheet 26. The degree of diffusion of the diffusion treatment 522 shown by the solid line 522 has a distribution similar to that shown in FIG. 37B.

Regarding the light-guiding plate 12, the viewing angle in the direction perpendicular to the longitudinal direction of the side light source 14 is generally extremely narrow compared with the viewing angle in the direction parallel to the longitudinal direction. If setting a degree of diffusion in the parallel direction to the same extent as the degree of diffusion in the direction perpendicular to the longitudinal direction of the side light source 14, the defect arises that the degree of diffusion in the parallel direction becomes stronger.

Figures 39A, 39B:
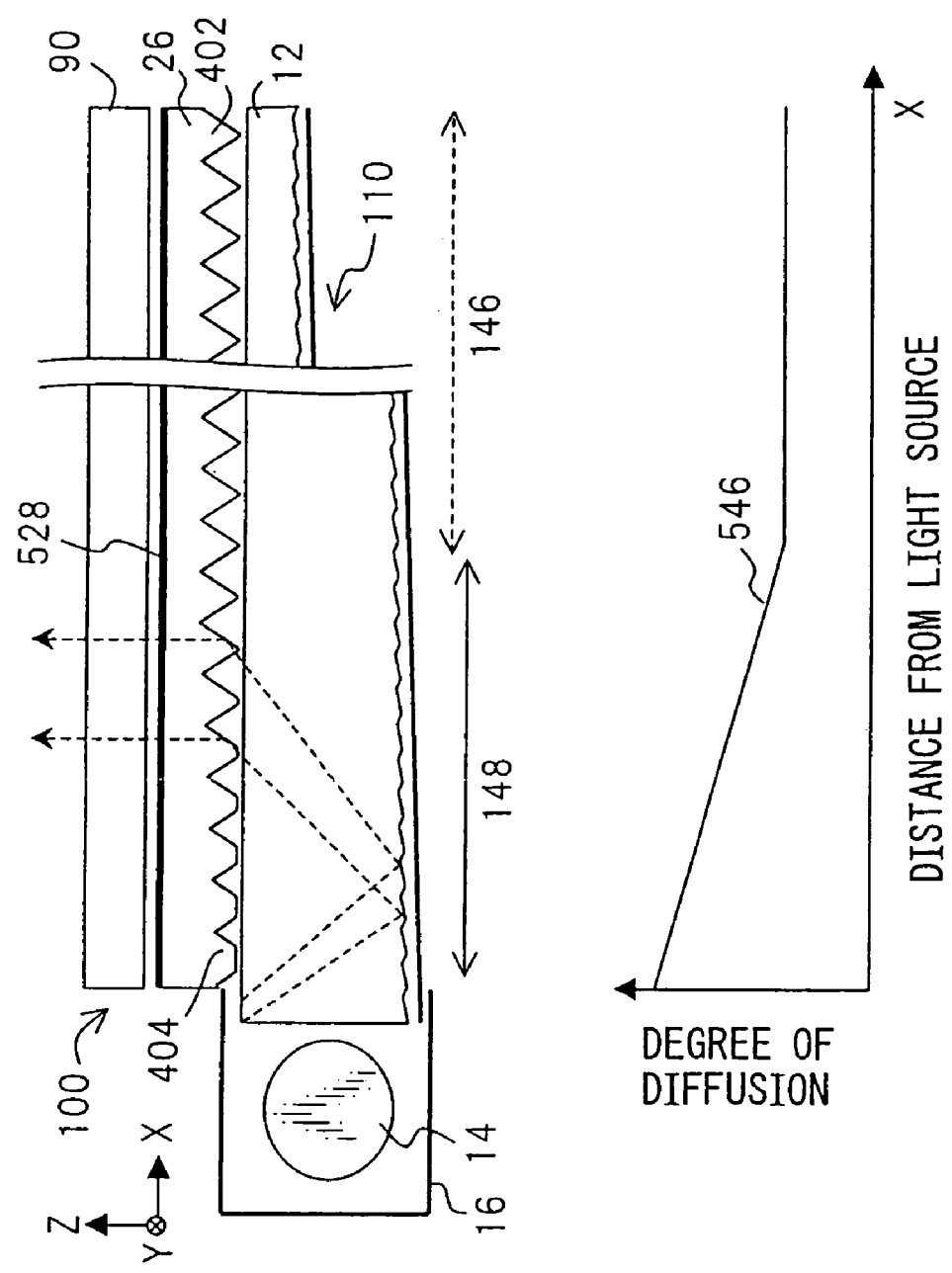
FIG. 39A is a side view of a planar light source device having a prism sheet treated for diffusion to make the luminance more uniform and enlarge the viewing angle at a region near the light source.
FIG. 39B shows the distribution of the degree of diffusion treatment with respect to the distance from the light source in the X-direction at the prism sheet of FIG. 39A.
Figure 40:
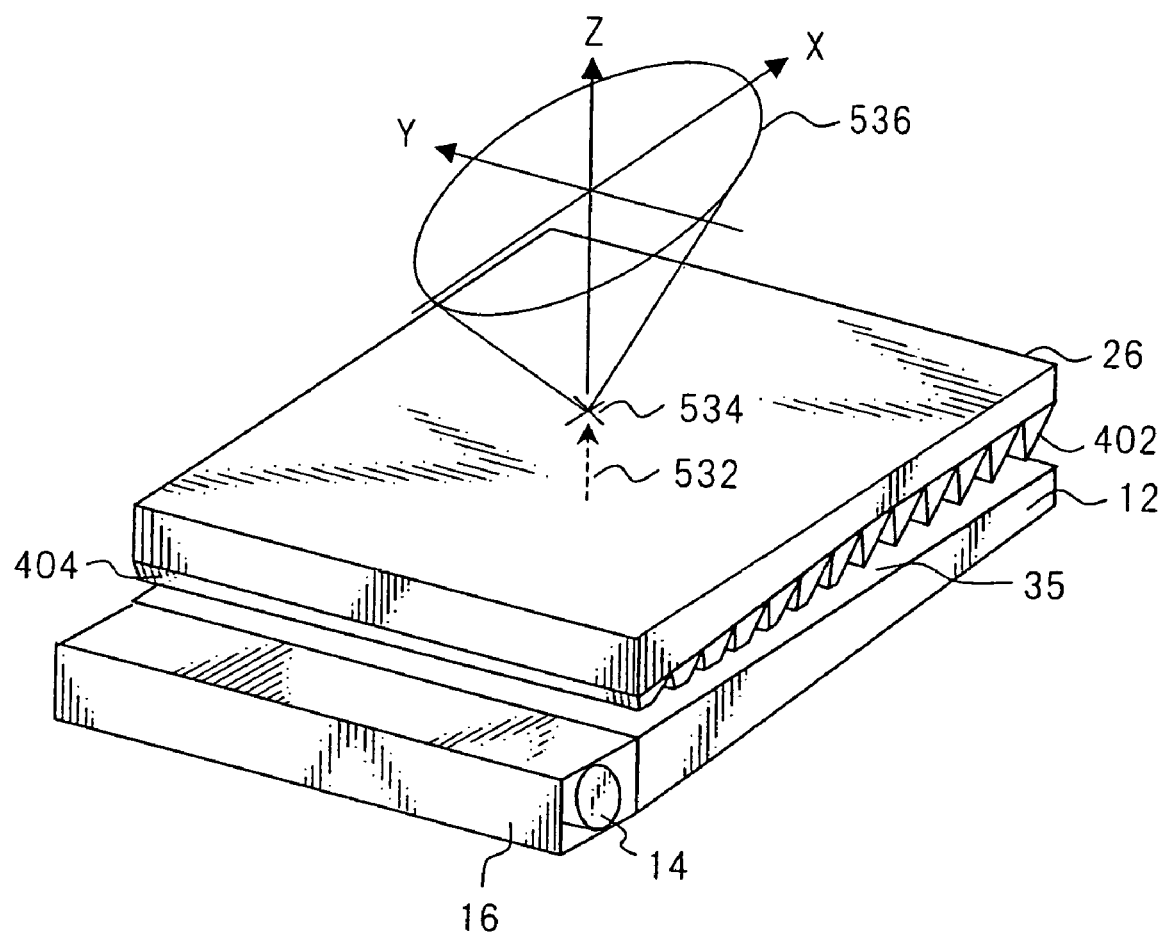
FIG. 40 shows diffusion having a degree of diffusion different in the X-direction and Y-direction in the prism sheet 40.

FIG. 40 shows diffusion having a degree of diffusion different in the X-direction and Y-direction at the prism sheet 26. It is preferable to make the degree of diffusion in the direction parallel to the longitudinal direction of the side light source 14 relatively weak compared with direction perpendicular to it and ensure that an optimal degree of diffusion is formed in both the perpendicular direction and the longitudinal direction and thereby have the viewing angle in the perpendicular direction enlarged. As a technique giving anisotropy to the degree of diffusion, there is the method using oval-shaped air bubbles as described in the known Japanese Unexamined Patent Publication (Kokai) No. 2001-4813. Here, the entirety of that document is incorporated by reference. Therefore, it is sufficient to use such oval-shaped air bubbles at the diffusion treatment part 526 of FIG. 38A. At the diffusion treatment part 528 of FIG. 39A, it is sufficient to form oval-shaped air bubbles, then place fine particles against the region 148 and thereby give the degree of diffusion treatment the distribution 546. In FIG. 40, the light 532 passing through the prism sheet 26 and proceeding to the front surface becomes broader in the X-direction and narrower in the Y-direction as shown by the diffusion range 536 at the top surface given the diffusion treatments 526 and 528 having anisotropy in this way.

FIG. 39A is a side view of the planar light source 110 having a prism sheet 26 given the diffusion treatment 528 for making the luminance more uniform and enlarging the viewing angle at the region 148 near the light source 14. In this figure as well, in the same way as FIG. 38A, the diffusion sheet 24 at FIG. 37A is removed. In this case, the diffusion sheet 24 is unnecessary, so the structure of the planar light source 110 becomes simpler. Further, it is sufficient to apply diffusion treatment just once to the surface of the front surface of the prism sheet 26, so the treatment steps become simple. FIG. 39B shows the distribution 546 of the degree of diffusion treatment with respect to the distance from the light source 14 in the X-direction in the prism sheet of FIG. 39A.

The solid line 546 in FIG. 39B shows the distribution of the degree of diffusion of the diffusion treatment 528 at the surface of the front surface of the prism sheet 26. The degree of diffusion of the diffusion treatment 526 corresponds to the sum of the distributions 542 and 544 of FIG. 38B. At the region 158 of the prism sheet 26 near the light source 14, the degree of diffusion becomes larger the closer to the light source 10, while at the region 56 far from the light source 10, it is substantially constant over the entire area.

Figure 41A:
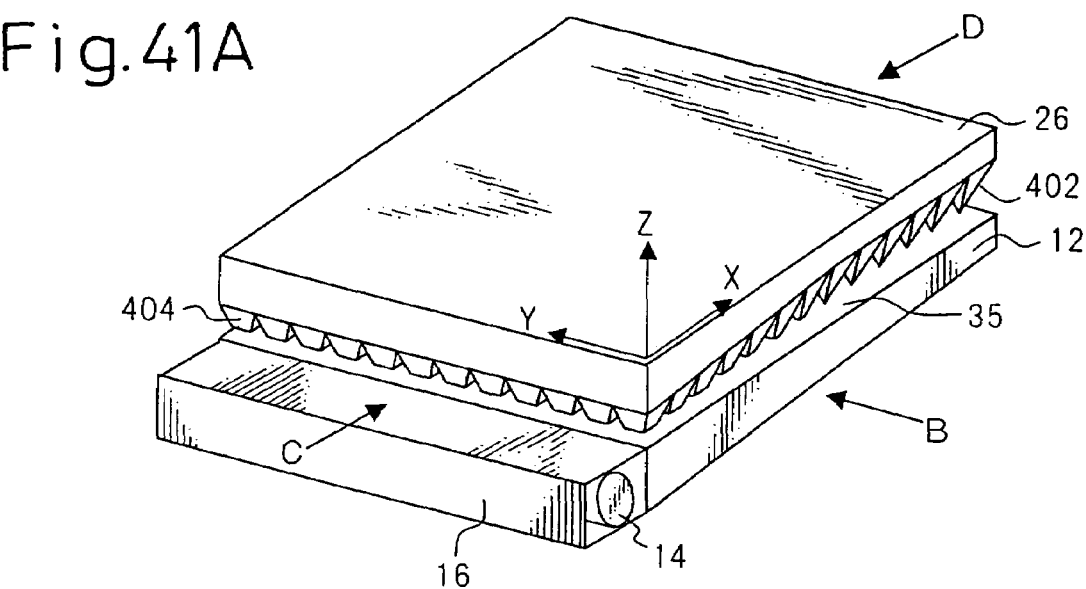
FIG. 41A shows a perspective view of a prism sheet having a prism part split in the Y-direction by a plurality of grooves.
Figure 41B:
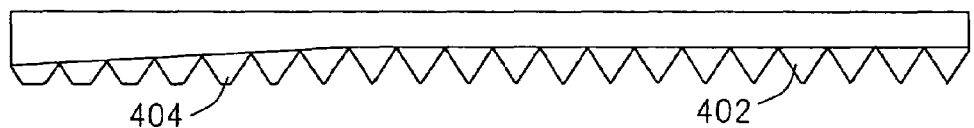
FIGS. 41B to 41D show side views of the prism sheet as seen in the B-, C-, and D-directions in FIG. 41A.
Figure 41C:
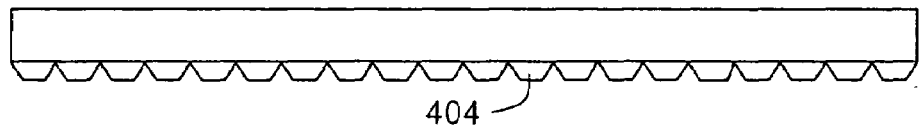
Figure 41D:
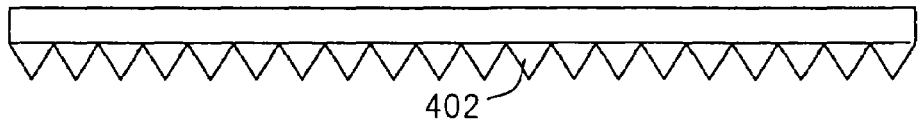
Figure 42A:
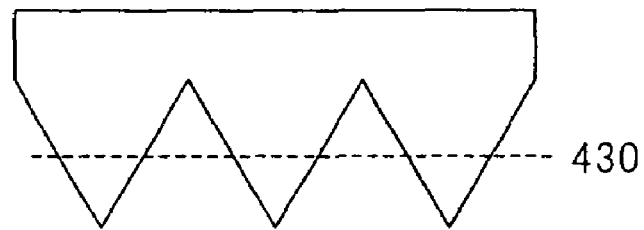
FIGS. 42A to 42E show the basic shapes of prism parts.
Figure 42B:
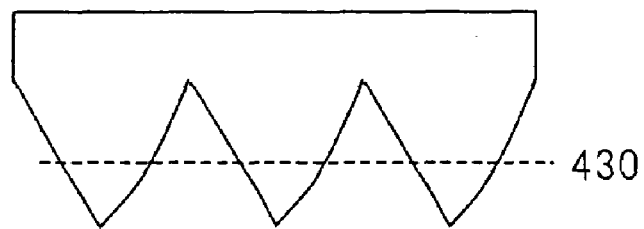
Figure 42C:
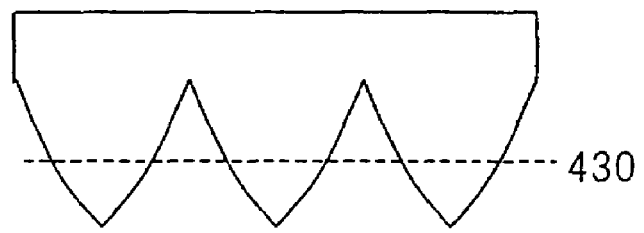
Figure 42D:
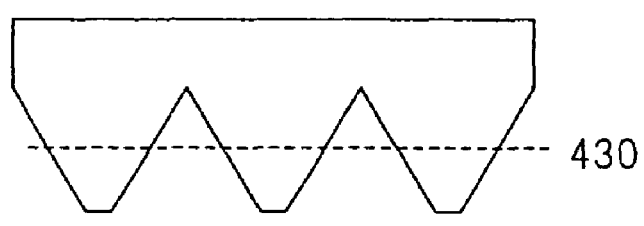
Figure 42E:
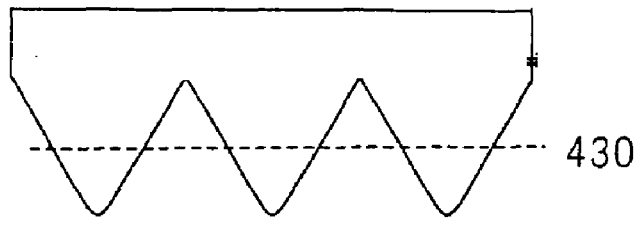

FIG. 41A—shows a perspective view of a prism sheet 40 having prism parts 402 and 404 divided along the Y-direction by a plurality of grooves. FIGS. 41B to 41D show side views of the prism sheet seen along the B-, C-, and D-directions (Y-direction, X-direction and -X-direction) in FIG. 41A. The prism parts 402 and 404 are formed into pyramid shapes. The plurality of grooves in the X-direction or the prism shapes are provided as alternative configurations to the prism part 134 of the top surface of the light-guiding plate 12. Therefore, in this case, the top surface 134 of the light-guiding plate is flat. When the prism parts 402 and 404 are not pyramid shapes as shown in FIG. 41A, that is, when the peak line of the plurality of prism parts 1134 at the top surface of the light-guiding plate 12 (FIG. 32) and the peak line of the plurality of prism parts 402 and 404 of the prism sheet 26 intersect with each other, vibration from the outside to the liquid crystal display 100 will cause the light-guiding plate 12 and the prism parts 402 and 404 to rub against each other at those peak lines and thereby the peak line parts of the prisms will be damaged. Such damage can be prevented by the pyramid structure of FIG. 41A.

FIGS. 42A to 42E show basic shapes of the prism parts 402 and 404. The broken line 430 shows the position of the flat parts 406 of the prisms 404. The prism parts of FIG. 42A have flat inclined surfaces. The prism parts of FIG. 42B have flat inclined surfaces at the light source 10 side and inclined surfaces curved into projections at the opposite sides. The prism parts of FIG. 42C have both inclined surfaces curved into projections. The prism parts of FIG. 42D have the points of the peaks at the bottom sides flattened. The prism parts of FIG. 42E have the points of the peaks rounded. Due to the structures of FIGS. 42D and 42E, the tendency for the peaks of the prism parts 402 and 404 of the prism sheet 26 and the top surface of the light-guiding plate 12 to rub against each other and damage each other is reduced.

The embodiments explained above were only given as representative examples. The combinations of the elements of the embodiments and their modifications and variations are clear to persons skilled in the art. A person skilled in the art clearly could make various modifications to the above embodiments without departing from the principles of the present invention and the scope of the invention set forth in the claims.

As explained above, according to the present invention, by providing a plurality of projections or depressions at inside surfaces of end parts of a reflector, the light striking the light-guiding plate and becoming bright lines from the gaps of overlapping regions of the reflector and light-guiding plate or the imperfect edges of the light-guiding plate is eased and thereby a planar light source with a uniform luminance distribution is obtained. Further, by providing a plurality of projections or depressions extending substantially parallel to the emission surface of the light-guiding plate at the incident surface of the light-guiding plate, the angular distribution of the light proceeding from the incident surface to the light-guiding plate is made uniform and unevenness of luminance is improved.

Further, by combining a light-guiding plate having a prism incident surface, prism reflection surface, and prism emission surface and a reflection sheet having a regular reflection rate of at least 80%, it is possible to obtain a light of a high luminance and having a luminance distribution substantially uniform from close to the light source to far from it.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A light-guiding plate comprising:
    an incident surface; and
    an emission surface substantially perpendicular to said incident surface,
    said incident surface having a plurality of projections or depressions extending substantially parallel to said emission surface, and
    said incident surface having flat planes among said projections or depressions.

2. The light-guiding plate as set forth in claim 1, wherein said light-guiding plate has projections at the emission surface.

3. The light-guiding plate as set forth in claim 1, said projections or depressions formed as wavy curves.

4. The light-guiding plate as set forth in claim 1, said projections or depressions are formed as a V-shape, wherein a vertical angle of said V-shape is 90 degrees to 150 degrees. actions or depressions are formed.

5. The light-guiding plate as set forth in claim 1, wherein said projections or depressions are formed by combining a plurality of planes.

6. An optical source device comprising:
    a light source; and
    a light-guiding plate comprising:
        an incident surface receiving light from said light source, and
        an emission surface substantially perpendicular to said incident surface,
        said incident surface having a plurality of projections or depressions extending substantially parallel to said emission surface, and
        said incident surface having flat planes among said projections or depressions.

7. The optical source device as set forth in claim 6, wherein said light-guiding plate has projections at the emission surface.

8. The optical source device as set forth in claim 6, wherein said projections or depressions are formed as wavy curves.

9. The optical source device as set forth in claim 6, wherein said projections are formed as a V-shape, wherein a vertical angle of said V-shape is 90 degrees to 150 degrees.

10. The optical source device as set forth in claim 6, said projections or depressions are formed by combining a plurality of planes.

11. An electronic device comprising:
    a display element; and
    a light-guiding plate comprising:
        an incident surface, and
        an emission surface substantially perpendicular to said incident surface and emitting to said display element, said incident surface having a plurality of projections or depressions extending substantially parallel to said emission surface, and said incident surface having flat planes among said projections or depressions.

12. The electronic device as set forth in claim 11, wherein said light-guiding plate has projections at the emission surface.

13. The electronic device as set forth in claim 11, wherein said projections or depressions are formed as wavy curves.

14. The electronic device as set forth in claim 11, wherein said projections or depressions are formed in a V-shape, wherein a vertical angle of said V-shape is 90 degrees to 150 degrees.

15. The electronic device as set forth in claim 5, wherein said projections or depressions are formed by combining a plurality of planes.

* * * * *

UNITED STATES PATENT AND TRADEMARK OFFICE
CERTIFICATE OF CORRECTION

| | |
|---|---|
| PATENT NO. | : 7,604,388 B2 |
| APPLICATION NO. | : 12/071404 |
| DATED | : October 20, 2009 |
| INVENTOR(S) | : Chikara Nishio et al. |

Page 1 of 1

It is certified that error appears in the above-identified patent and that said Letters Patent is hereby corrected as shown below:

Column 22, Line 34, Claim 4, delete "actions or depressions are formed.".

Signed and Sealed this

Sixteenth Day of March, 2010

David J. Kappos
*Director of the United States Patent and Trademark Office*